United States Patent
Newell et al.

(10) Patent No.: US 9,743,118 B2
(45) Date of Patent: Aug. 22, 2017

(54) APPARATUS, SYSTEMS AND METHODS FOR A CONTENT COMMENTARY COMMUNITY

(71) Applicant: EchoStar Broadcasting Corporation, Englewood, CO (US)

(72) Inventors: Nicholas Brandon Newell, Centennial, CO (US); Omar Khan, Englewood, CO (US)

(73) Assignee: EchoStar Broadcasting Corporation, Englewood, CO (US)

( * ) Notice: Subject to any disclaimer, the term of this patent is extended or adjusted under 35 U.S.C. 154(b) by 0 days.

(21) Appl. No.: 15/289,585

(22) Filed: Oct. 10, 2016

(65) Prior Publication Data

US 2017/0026669 A1    Jan. 26, 2017

Related U.S. Application Data

(63) Continuation of application No. 14/802,842, filed on Jul. 17, 2015, now Pat. No. 9,467,718.

(Continued)

(51) Int. Cl.
*H04N 21/233* (2011.01)
*G10L 25/57* (2013.01)
(Continued)

(52) U.S. Cl.
CPC ....... *H04N 21/233* (2013.01); *G02B 27/0172* (2013.01); *G06Q 50/01* (2013.01); *G06T 19/006* (2013.01); *G10L 15/08* (2013.01); *G10L 15/26* (2013.01); *G10L 25/57* (2013.01); *G11B 27/036* (2013.01); *H04N 21/2353* (2013.01); *H04N 21/2541* (2013.01); *H04N 21/2668* (2013.01); *H04N 21/2743* (2013.01); *H04N 21/4223* (2013.01); *H04N 21/42203* (2013.01); *H04N 21/4312* (2013.01); *H04N 21/4345* (2013.01);
(Continued)

(58) Field of Classification Search
CPC combination set(s) only.
See application file for complete search history.

(56) References Cited

U.S. PATENT DOCUMENTS 6,774,926 B1    8/2004  Ellis et al.
9,306,989 B1 *  4/2016  Jayaram ................ H04L 65/403
(Continued)

*Primary Examiner* — Mulugeta Mengesha
(74) *Attorney, Agent, or Firm* — Lowe Graham Jones PLLC

(57) ABSTRACT

Systems and methods of emulating a conversation about a thematic content event are disclosed. An exemplary embodiment receives a member dialog video from a community member who is a member of a plurality of community members, wherein the member dialog video includes video and audio portions, and wherein the member dialog video expresses at least one of a personal opinion and a personal viewpoint about the thematic content event; generates dialog text from the audio portion of each received member dialog video, wherein the dialog text comprises words and phrases spoken by the community member in the member dialog video; receives a modified thematic content event; compares the words and phrases of the dialog text with the plurality of keywords; and associates at least one portion of the member dialog video having the words and phrases of the dialog text that match with the matching keyword of the anchor point.

20 Claims, 7 Drawing Sheets

Related U.S. Application Data

(60) Provisional application No. 62/157,575, filed on May 6, 2015.

(51) Int. Cl.

| | |
|---|---|
| G11B 27/036 | (2006.01) |
| H04N 21/2668 | (2011.01) |
| H04N 21/472 | (2011.01) |
| H04N 21/475 | (2011.01) |
| H04N 21/81 | (2011.01) |
| H04N 21/235 | (2011.01) |
| H04N 21/4223 | (2011.01) |
| H04N 21/422 | (2011.01) |
| H04N 21/2743 | (2011.01) |
| G02B 27/01 | (2006.01) |
| G06T 19/00 | (2011.01) |
| H04N 21/254 | (2011.01) |
| H04N 21/431 | (2011.01) |
| H04N 21/434 | (2011.01) |
| H04N 21/4627 | (2011.01) |
| H04N 21/4788 | (2011.01) |
| H04N 21/482 | (2011.01) |
| H04N 21/84 | (2011.01) |
| G06Q 50/00 | (2012.01) |
| G10L 15/26 | (2006.01) |
| G10L 15/08 | (2006.01) |
| H04L 12/58 | (2006.01) |

(52) U.S. Cl.
CPC ..... *H04N 21/4627* (2013.01); *H04N 21/4756* (2013.01); *H04N 21/4758* (2013.01); *H04N 21/4788* (2013.01); *H04N 21/47205* (2013.01); *H04N 21/482* (2013.01); *H04N 21/816* (2013.01); *H04N 21/84* (2013.01); *G02B 2027/014* (2013.01); *G02B 2027/0134* (2013.01); *G06T 2200/04* (2013.01); *G10L 2015/088* (2013.01); *H04L 51/18* (2013.01); *H04L 51/32* (2013.01)

(56) References Cited

U.S. PATENT DOCUMENTS

| | | | |
|---|---|---|---|
| 2007/0288987 | A1 | 12/2007 | Kim et al. |
| 2014/0036022 | A1* | 2/2014 | Croen ............... H04N 7/147 348/14.01 |
| 2014/0089801 | A1* | 3/2014 | Agrawal ............ G06F 3/0484 715/719 |
| 2014/0188997 | A1* | 7/2014 | Schneiderman ........ H04L 51/32 709/204 |
| 2014/0201125 | A1* | 7/2014 | Moeinifar ......... G06Q 30/0241 706/47 |

\* cited by examiner

APPARATUS, SYSTEMS AND METHODS FOR A CONTENT COMMENTARY COMMUNITY

APPLICATION PRIORITY

This patent application is a Continuation of U.S. Non-Provisional patent application Ser. No. 14/802,842, filed Jul. 17, 2015, entitled "APPARATUS, SYSTEMS AND METHODS FOR A CONTENT COMMENTARY COMMUNITY," and issued as U.S. Pat. No. 9,467,718 on Oct. 11, 2016, which claims the benefit of and priority to U.S. Provisional Patent Application No. 62/157,575, filed May 6, 2015, entitled "APPARATUS, SYSTEMS AND METHODS FOR A CONTENT COMMENTARY COMMUNITY," the contents of which are both herein incorporated by reference in their entirety.

BACKGROUND

Thematic content presents theme-based visual and audio content to a user for their enjoyment and/or for informative purposes. Examples of such theme-based content includes movies, films, serial programming, sporting events, documentaries, newscasts, religious programs, commercials (typically of short duration with advertising content), or the like. Serial programming may present a continuing plot and/or theme, often with the same cast of actors, in a sequential episode-by-episode basis that is available periodically.

Thematic content is readily available for presentation to the user (i.e., viewing and listening to by the user) at a user's home. Thematic content may even be presentable to a user on their mobile devices. Such thematic content, if in the form of a feature movie or film, may also be available at a public location, such as a movie theatre or the like. Other public places, such as bars, restaurants, office lobbies, libraries, or the like, may include televisions or other presentation devices for viewing thematic content by their patrons.

Thematic content may be provided for user presentation using a variety of content delivery methods. For example, the thematic content may be provided to a user's home entertainment system (e.g., their television or the like) via a broadcast system or by an on-demand system. Other devices, such as the user's portable smart phone, tablet, notebook computer, or the like may be used to access thematic content from a remote website or the like via the Internet or other suitable communication system. Alternatively, thematic content may be provided to the user on a portable memory medium, such as a digital video disk (DVD), flash memory device, or the like.

In some situations, a group of friends may go to a public theatre or the like to view a feature film or other thematic content. Afterwards, the group may go to a coffee shop or other location wherein a lively and interesting conversation about the recently viewed thematic content ensues. Many individuals find such group conversations about the thematic content enjoyable and highly desirable.

In other situations, thematic content may be presented to the user when the user is alone or with a limited number of other individuals. In such situations, it may be difficult for the user to have a lively and interesting conversation about the presented thematic content with a group of other individuals because the other individuals may have not yet seen the thematic content, the other users may have previously seen the thematic content a relatively long time ago (and have therefore forgotten the thematic content at least to some extent), or the other users may simply not be available to carry on a conversation about the thematic content.

With the advent of the Internet and other communication media, a variety of social networking systems have been devised wherein individuals may input their commentary about a particular thematic content event that they have seen. Other users may access such social media facilitated commentary. Accordingly, the user may read and/or listen to the one-sided commentary provided by other individuals. However, the user viewing such commentary is not going to have an experience that is comparable to the above-described group of friends who are together to discuss a particular thematic content event.

Accordingly, there is a need in the arts to provide a user experience that is comparable to, emulates, or at least approximates, the above-described group of friends who are together to discuss a particular thematic content event.

SUMMARY

Systems and methods of emulating a conversation about a thematic content event are disclosed. An exemplary embodiment receives a member dialogue video from a community member who is a member of a plurality of community members, wherein the member dialogue video includes video and audio portions, and wherein the member dialogue video expresses at least one of a personal opinion and a personal viewpoint about the thematic content event; generates dialogue text from the audio portion of each received conversation video, wherein the dialogue text comprises words and phrases spoken by the community member in the member dialogue video; receives a modified thematic content event; compares the words and phrases of the dialogue text with the plurality of keywords; and associates at least one portion of the member dialogue video having the words and phrases of the dialogue text that match with the anchor point of the matching keyword. The modified thematic content event comprises a plurality of anchor points, wherein each anchor point comprises a unique identifier and an anchor point locator that identifies a location in the thematic content event; and a plurality of keywords, wherein each keyword is associated with at least one anchor point, and wherein each keyword is a single word or a phrase that is descriptive of a characteristic of the thematic content event at the location in the thematic content event identified by the associated anchor point.

BRIEF DESCRIPTION OF THE DRAWINGS

Preferred and alternative embodiments are described in detail below with reference to the following drawings.

DETAILED DESCRIPTION

A. Topology Overview

Figure 1:
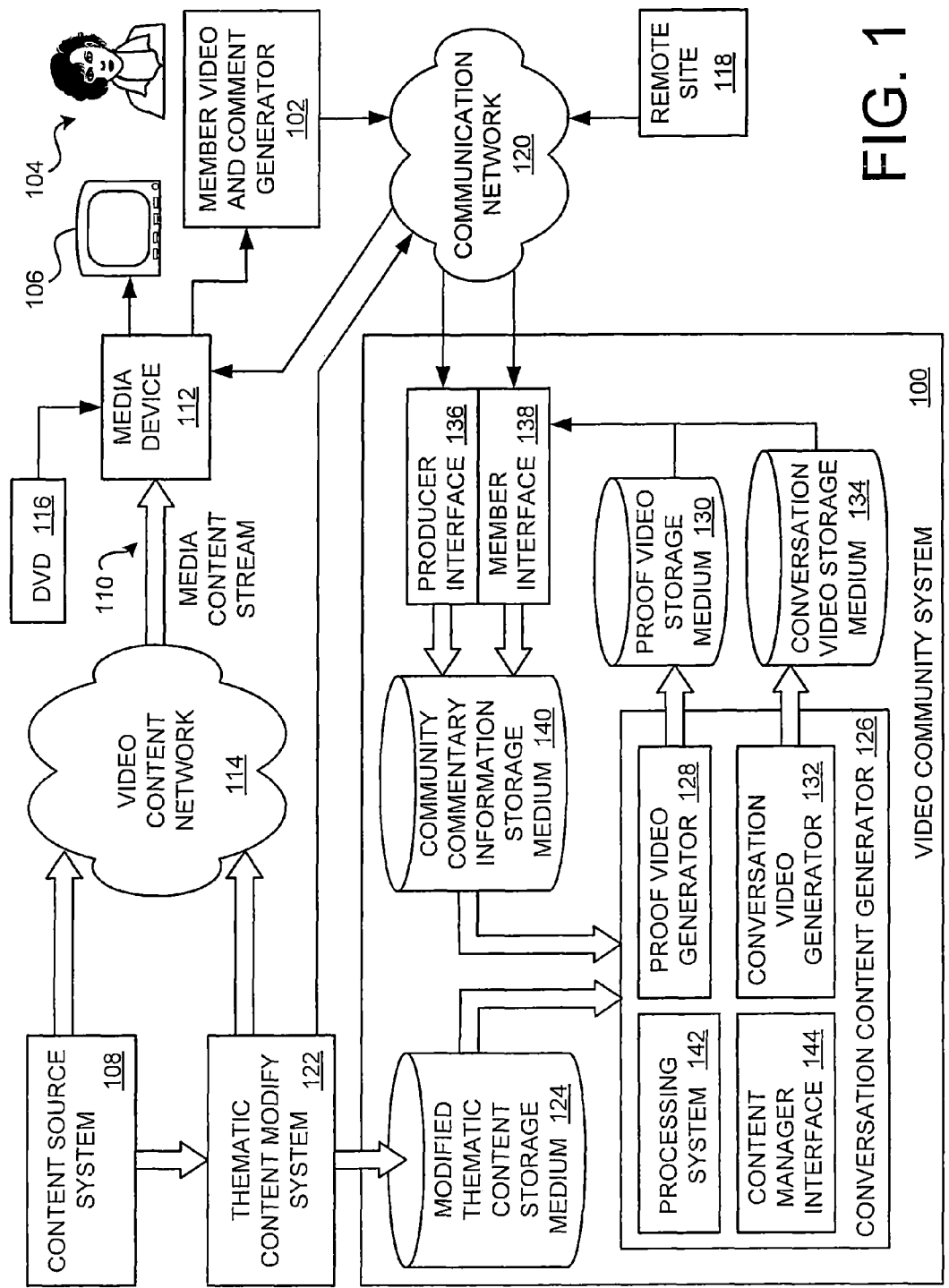
FIG. 1 is a block diagram of an embodiment of a video community system operating in a content presentation and communication environment.

FIG. 1 is a block diagram of an embodiment of a video community system 100 operating in a media content presentation and communication environment. Conceptually illustrated is a user 104 who is viewing a thematic content event (interchangeably referred to herein as a video) that is being presented on a media presentation system 106, conceptually illustrated as a television (TV).

Embodiments of the video community system 100 are configured to receive video and/or audio commentary from community members from a member video and content generator 102, such as the user 104 or a plurality of other users (not shown), who have viewed the thematic content event. The received video and/or audio commentary is preferably self-recorded by the community member and is referred to herein as a member dialogue video. The member dialogue video includes video and audio information that expresses the personal opinions and/or personal viewpoint of the community member about a particular thematic content event. Additionally, other individuals (not shown) that are knowledgeable about the thematic content event may provide video and/or audio commentary, referred to herein as producer dialogue videos.

Based on the received member dialogue videos and/or producer dialogue videos about a particular thematic content event, embodiments of the video community system 100 then generate a conversation video that incorporates selected ones of the received member dialogue videos and/or producer dialogue videos (or portions thereof). The conversation video may optionally include selected portions of that particular thematic content event.

The generated conversation video emulates a conversation about the thematic content event between the user 104 and other community members and/or knowledgeable individuals. The conversation video is a presentation of selected member dialogue videos (or portions thereof), thereby presenting the personal opinions and/or personal viewpoints of the community members about a particular thematic content event. Optionally, the conversation video may include one or more producer dialogue videos (or portions thereof) that have been generated by another person who is knowledgeable about the thematic content event. Thus, upon viewing the conversation video, the user 104 has an experience that is comparable to the above-described group of friends who are together to discuss the thematic content event.

The thematic content event may be provided to the user 104 in a variety of manners. For example, a content source system 108 may provide a media content stream 110 that is received by a media device 112, such as a set top box (STB) or the like. The thematic content event may be concurrently broadcast from the content source system 108 to the media device 112 over a suitable video content network 114 along with a plurality of other thematic content events. Alternatively, or additionally, the thematic content event may be directly accessed via an on-demand system operated by the content source system 108.

In a broadcast environment, one or more media content streams 110 are communicated to the media device 112 from the content source system 108, which may include a remote head end facility (not shown), operated by a content service provider. Non-limiting examples of such video content networks 114 include satellite systems, cable systems, over-the air broadcast systems, and the Internet. For example, if the content service provider provides a thematic content event via a satellite-based communication system, the media device 112 is configured to receive one or more broadcasted satellite signals detected by an antenna (not shown). Alternatively, or additionally, the media content stream 110 can be received from one or more different types of video content networks 114, such as, but not limited to, a cable system, an over-the air radio frequency (RF) communication system, or the Internet.

A particular thematic content event may be obtained from other sources. For example, but not limited to, a thematic content event may be stored in a suitable memory medium, such as a digital video disk (DVD) 116. A DVD player (not shown) may access the thematic content event stored on the DVD 116, and then communicate the accessed thematic content event to the media device 112 or to the media presentation system 106. Other non-limiting examples that may access a stored thematic content event include electronic devices, such as a personal computer, a smart phone, a tablet or the like may have a memory medium that has stored the thematic content event. Such electronic devices, when communicatively coupled to a display (or that include a display), may present the accessed thematic content event to the user 104. (It is also understood that such devices have audio presentation systems which present the audio portion of the thematic content event for listening by the user 104).

As another non-limiting example, the thematic content event may be accessed from a remote site 118, such as from an Internet site or the like, that provides thematic content to a plurality of users via the communication network 120. The communication network 120 is illustrated as a generic communication system. In one embodiment, the communication network 120 may be the Internet, a telephony system, a public or private Wi-fi system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. Additionally, embodiments of the communication network 120 may be implemented to communicate using other types of communication technologies, such as but not limited to, digital subscriber loop (DSL), X.25, Internet Protocol (IP), Ethernet, Integrated Services Digital Network (ISDN) and asynchronous transfer mode (ATM). Also, embodiments of the communication network 120 may be configured to communicate over combination systems having a plurality of segments which employ different formats for each segment that employ different technologies on each segment.

B. Conversation Video and Proof Video

Embodiments of the video community system 100 employ a plurality of novel techniques to create thematic content event-based conversations that emulate an experience that is comparable to the above-described group of friends who are together to discuss a particular thematic content event, defined herein as emulated conversation content. The emulated conversation content exists in two forms: the conversation video and a proof video.

Each conversation video is associated with a particular thematic content event of interest. For example, the thematic content event of interest and the conversation video may have the same or similar titles. Or, part of the conversation video data includes the title of the thematic content event of interest so that when a request for a particular thematic content event is received from the user 104, the title included in the conversation video data can be used to identify and provide the associated conversation video since the title matches the title of the thematic content event. If needed, other portions of the conversation video data can have clues or the like that can be used to identify and provide the associated conversation video since the speaker is likely talking about a particular thematic content event.

The conversation video emulates a conversation about a particular thematic content event between the user 104 and other community members (users) and/or knowledgeable individuals. The presented conversation video may include conversations on a plurality of the scenes in the thematic content event. The order of conversation about the scenes may be presented in an order that corresponds to the presentation of scenes in the thematic content event. Alternatively, or additionally, groups of related topic scenes may be discussed together. Any suitable presentation order of scene discussion may be used by the various embodiments.

Alternatively, or additionally, the presented conversation video may include conversations on one or more topics pertaining to the thematic content event. An example conversation video may include a conversation (video and/or audio commentary) provided by a plurality of community members and/or another knowledgeable individuals that are particularly knowledgeable about the topic of interest. For any given topic, one or more conversations (or portions thereof) are sequentially assembled together to emulate a conversation about that topic. A conversation video may address only a single topic, or may present a plurality of different topics. For example, but not limited to, a conversation video may present a series of different topics, wherein each topic corresponds to a particular scene of the thematic content event, and the order of the presented conversation video topics correspond to the order of the associated scenes in the thematic content event.

As another example, the conversation video topics may include commentary pertaining to one or more particular themes. The conversation video topics may include a discussion about one or more particularly interesting scenes (such as a discussion about the subject matter of the scene, a discussion about aspects pertaining to the scene setting, and/or a discussion about special effects) that were presented in the thematic content event. Another example conversation video topic may include commentary on the performance of the actors, such as overall performance throughout the thematic content event and/or a particular actor's performance in a particular scene.

The conversation video may optionally include one or more selected portions of the thematic content event (video portions and/or audio portions) itself to facilitate the emulated conversation about a particular topic of the thematic content event. For example, during a conversation about a particular scene, the scene or a portion thereof may be presented as part of the conversation video to remind the user 104 of the scene.

Such scenes or portions thereof may be presented using any suitable format, such as a picture over picture format, a picture in picture format, a split screen format, a full screen format, or the like, wherein the presented scene is relatively smaller than the view field of the display presenting images of the speaker. Alternatively, images of the current speaker may be relatively smaller than the view field of the display that is presenting the scene.

In some instances, all of or selected portions of the audio portion of the scene may be omitted to permit continued presentation of community member audio commentary. In other situations, the volume of the audio portion of the scene may be reduced to a relatively lower level so that continued presentation of community member commentary may be presented at a higher volume level.

Additionally, or alternatively, selected portions of other thematic content events may be added into the conversation video to further facilitate conversation about the thematic content event. For example, the current thematic content event being discussed may be a sequel in a series of related movies. At times, portions of one or more of the prequels may be added into the conversation video to facilitate a current discussion that is being presented in the conversation video. In some instances, the conversation video may at times discuss or provide commentary to such other thematic content events.

Textual information may also be presented to the user 104 as part of the conversation video. A pop-up window, a banner, or the like may present any suitable textual information of interest. The textual information may be presented as a stream of textual information scrolling across the banner. The textual information may describe some aspect of the currently discussed topic of the conversation video. Alternatively, or additionally, the textual information may identify actors, provide scene setting or location information, and/or describe other characteristics of the thematic content event. Alternatively, or additionally, the textual information may identify the particular community member(s) or other individual(s) providing commentary during the conversation video.

The proof video presents video and audio commentary from one or more community members wishing to become a recognized expert. The proof video commentary presents personal opinions and views of a particular community member about a particular thematic content event and/or a particular genre and/or topic pertaining to the thematic content event. Proof videos provide an opportunity for the particular community member to establish (prove) to the "community" that they are very knowledgeable about some aspect of a particular thematic content event and/or a particular genre and/or topic pertaining to the thematic content event. Embodiments of the video community system 100 generate the proof video using rant videos from the community member and endorsement videos from other knowledgeable individuals.

Based on the viewing of the proof video by other community members, optionally including the user 104, community members may "vote" for that particular member as an affirmation, or as a denial of affirmation, of that particular member's assertion that they are knowledgeable in a particular thematic content event and/or a particular genre and/or topic pertaining to the thematic content event. For example, the user 104, upon viewing a particular proof video of a particular member, may provide a "thumbs up" vote as an affirmation (an affirmation vote) if the user likes the proof video. On the other hand, the user 104 may provide a "thumbs down" vote (a denial of affirmation vote) if the user 104 dislikes the proof video.

Based on votes from community members, that particular community member may eventually be affirmed within the community as a recognized expert. That is, that community member may become recognized within the community as being particularly knowledgeable about a particular thematic content event and/or a particular genre and/or topic pertaining to the thematic content event.

Affirmation may be achieved by a community member, in an example embodiment, after a predefined number of other community members provide affirmation votes greater than or at least equal to a threshold number of affirmation votes after viewing the proof video of that particular community member. Alternatively, or additionally, affirmation may be achieved if the community member has a voting ratio of affirmation votes to denial of affirmation votes that is greater than or at least equal to a predefined ratio.

Further, affirmation status may be maintained so long as the community member maintains a predefined maintenance threshold ratio (which may be different than the predefined threshold ratio for achieving affirmation), and/or maintains the number of affirmation votes above some predefined maintenance threshold number (which may be different than the predefined threshold number of affirmation votes for achieving affirmation). In some embodiments, community members may later change their proof video voting from an affirmation vote to a denial of affirmation vote, or vice versa.

Once a community member has been recognized as being an expert in the community, that particular community member's commentary about a particular thematic content event may be given a preference and/or a higher priority for becoming selected for inclusion into a generated conversation video. That is, because it is more desirable to include commentary from a notoriously well known and recognized community member than from a non-recognized or relatively unknown community member, their commentary is more likely to be included in a conversation video.

Further, denial or loss of an affirmation a community member may provide a basis to exclude that particular member's commentary from future generated conversation videos. A community member may be denied affirmation if they receive a threshold number of denial of affirmation votes and/or if the ratio of affirmation to denial of affirmation votes falls below some predefined threshold. Further, a previously recognized expert community member may lose their expert status if they receive a threshold number of denial of affirmation votes (which may be different than the predefined threshold number of affirmation votes for achieving affirmation) and/or if the ratio of affirmation to denial of affirmation votes falls below some predefined threshold (which may be different than the predefined threshold ratio for achieving affirmation).

C. The Video Community System

The first novel technique used in the generation of emulated conversation content (the "conversation video") is the generation of a modified thematic content event. A modified thematic content event is generated from a thematic content event by addition of anchor points and associated keywords to the thematic content event.

Generation of the modified thematic content event is preferably performed at the thematic content modify system 122 by the producer of the thematic content event. The generated modified thematic content event is then provided to the video community system 100, and is stored in the modified thematic content storage medium 124 for later processing.

Alternatively, or additionally, the modified thematic content event may be generated by another knowledgeable party or entity having access to, and the ability to modify, the thematic content event. For example, but not limited to, a content service provider operating the content source system 108 is a knowledgeable entity that may generate, and/or further modify, the thematic content event to generate the modified thematic content event. Another example of a knowledgeable party may be a film critic person. An agent of the producer may be another example of a knowledgeable party.

Once generated, the modified thematic content event may be communicated or provided to the video community system 100 using any suitable means via any suitable communication system. As a non-limiting example, the modified thematic content event may be in an electronic format, which may then be communicated in the electronic format to the video community system 100 from an Internet website or the like, via the example communication network 120 or other suitable communication system. Alternatively, or additionally, the modified thematic content event may be stored on a physical memory medium, which may then be physically transferred to the video community system 100.

Embodiments of the video community system 100 comprise a conversation content generator 126 that generates proof videos and conversation videos. The proof video generator 128 generates proof videos which are stored in the proof video storage medium 130. The proof videos are generated based on video and audio commentary, referred to herein as a rant video, provided by a particular community member seeking affirmation as a recognized expert about one or more particular thematic content events and/or a particular genre and/or topic pertaining to the thematic content event. Proof videos are available for presentation to the user 104 who wishes to view proof videos of that particular community member.

The conversation content generator 126 further includes a conversation video generator 132 that generates the conversation videos. Conversation videos are generated based on conversations (video and/or audio commentary) on one or more topics pertaining to the thematic content event that have been received from a community member or other knowledgeable party. The conversation videos are stored in the conversation video storage medium 134, and are available for presentation to the user 104 who wishes to view the commentary video that is associated with a particular thematic content event of interest.

Embodiments of the video community system 100 further comprise a producer interface 136 that receives producer dialogue videos (video and/or audio commentary) from producers of the thematic content event or other knowledgeable parties. The video community system 100 also comprises a member interface 138 that receives member dialogue videos (video and/or audio commentary) from community members (i.e., the users who view the thematic content event and provide their commentary). The received producer dialogue videos and member dialogue videos are stored in the community commentary information storage medium 140.

The video community system 100 optionally includes a processing system 142 configured to manage the proof video generator 128 and the conversation video generator 132. In some embodiments, the processing system 142 includes a plurality of distributed processing devices that reside in the proof video generator 128 and the conversation video generator 132, and/or in other components of the video community system 100. Any suitable processing device may be used in the processing system 142.

A content manager interface 144 is included for inputting instructions, as needed, for operation of the processing system 142. Thus, the operator of the video community system 100 may provide via the content manager interface 144 specific inputs, update programming, mange storage, and perform other tasks as necessary to manage operation of the video community system 100. The content manager interface 144 may include a keyboard and/or other suitable input devices, a display screen, and optionally its own processor system (not shown) to facilitate input from the operator. In some embodiments, the content manager interface 144 may be a personal computer, a dedicated computing system, or the like that interfaces with the processing system 142 of the video community system 100.

In other embodiments, one or more of the elements of the video community system 100 may be combined with each other and/or may be integrated with other elements not specifically described or illustrated herein. Further, elements illustrated separately from the video community system 100, such as the thematic content modify system 122 or other elements, may be included in the video community system 100 and/or may be integrated with other elements of the video community system 100.

D. The Modified Thematic Content Event

Figure 2:
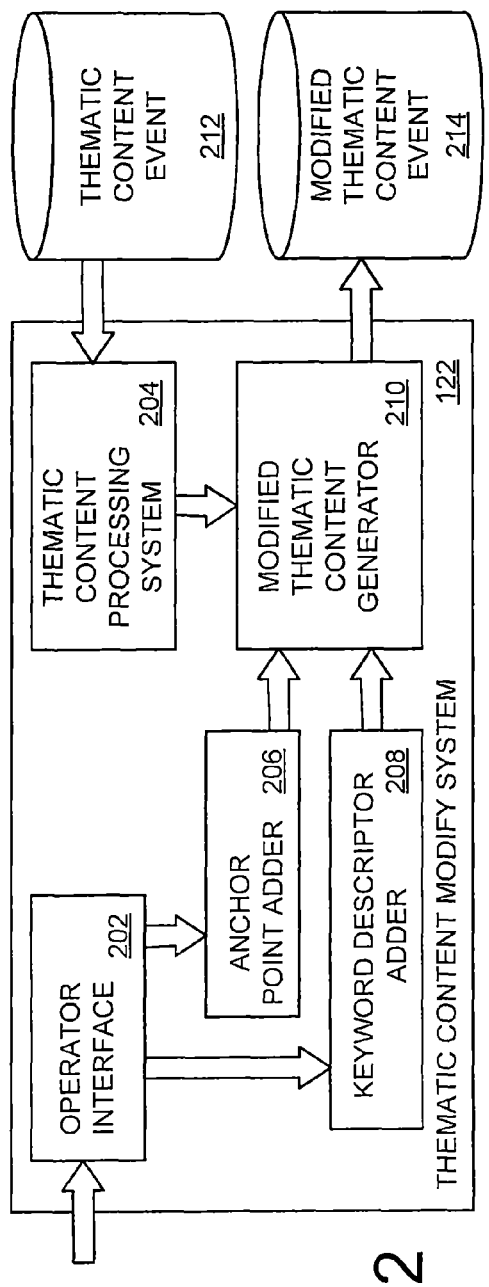
FIG. 2 is a block diagram of an example thematic content modify system that is configured to generate a modified thematic content event.

FIG. 2 is a block diagram of an example thematic content modify system 122 that is configured to generate a modified thematic content event. The example thematic content modify system 122 comprises an operator interface 202, a thematic content processing system 204 that receives and processes a thematic content event, an anchor point adder 206 that adds anchor points into a processed thematic content event, a keyword descriptor adder 208 that adds keyword descriptors into a processed thematic content event and that associates added keyword descriptors with particular anchor points, and a modified thematic content generator 210 that generates the modified thematic content event (which includes the added anchor points and the associated keyword descriptors). The elements of the thematic content modify system 122 are illustrated and described separately for clarity. In other embodiments, one or more of the elements of the thematic content modify system 122 may be combined with each other and/or may be integrated with other elements not specifically described or illustrated herein.

In the example embodiment, a single thematic content modify system 122 is illustrated in FIG. 2. However, a plurality of thematic content modify systems 122 may be used to generate different modified thematic content events. For example, a plurality of different media content producers and/or content providers may have their own thematic content modify systems 122. Additionally, or alternatively, another party or entity having access to, and the ability to modify, the thematic content event may have a thematic content modify system 122 to generate a modified thematic content event.

Further, a thematic content modify system 122 may be used to further modify a previously generated modified thematic content event. For example, additional key words and/or anchor points may be added. Alternatively, or additionally, selected key words and/or anchor points may be modified and/or deleted.

In practice the thematic content processing system 204 receives a particular thematic content event 212. The thematic content event 212 may be received in a streaming fashion in a received media content stream 110, or may be accessed from a memory medium upon which the thematic content event 212 has been previously stored on.

In the various embodiments, a received thematic content event 212 is processed to generate the modified thematic content event 214 by defining a plurality of anchor points for the thematic content event 212. An anchor point is a type of identifier that is used to identify a particular point in the thematic content event 212, that is used to identify a location in the thematic content event 212, and/or that is used to identify a portion of the thematic content event 212. Each anchor point comprises an anchor point identifier and an anchor point locator.

The anchor point identifier is a unique identifier that uniquely identifies a particular anchor point. Thus, each defined anchor point of the thematic content event 212 may be uniquely identified from the other anchor points based on its unique anchor point identifier. The anchor point identifier may be any suitable unique identifier, such as a numeric identifier, an alphabetic identifier, and/or an alpha numeric identifier.

The anchor point locator identifies the particular location and/or portion of interest in the thematic content event 212. An example anchor point locator may be associated with a particular video frame of the thematic content event 212 to locate a particular point in the thematic content event. As another example, a frame identifier (ID) or the like may be used to define an anchor point locator.

Alternatively, or additionally, the anchor point locator may be associated with a particular scene of the thematic content event 212. For example, a scene ID in the meta data may be used to define an anchor point locator that is associated with a particular scene of interest.

A scene may have multiple anchor points. For example, the anchor point may be added to identify different subject matter or topics that may occur at different points, or even at the same point, in the same scene or in a plurality of scenes. Alternatively, or additionally, multiple anchor points may be associated with different points or events in a scene.

Alternatively, or additionally, a particular time in the thematic content event 212 may be used to define an anchor point locator. For example, a time from the starting time of the thematic content event 212 may be specified as the anchor point locator. Or a presentation time associated with a particular video frame of interest may be specified as an anchor point locator.

Alternatively, or additionally, a portion of the thematic content event 212 may be used to define a duration type anchor point locator that defines a particular portion of the modified thematic content event. For example, a duration type anchor point locator may be associated with a particular scene of interest, or even a smaller portion of a scene of interest. Alternatively, or additionally, a duration type anchor point locator may be associated with a larger portion that spans a plurality of scenes that are presenting a related portion of the thematic content event. For example, the plurality of scenes may have a related particular subject matter, and/or may have a related particular topic, of the thematic content event 212. An anchor point locator associated with a duration of the thematic content event 212 may be defined by a starting time or a particular identified video frame, plus a specified duration. Alternatively, or additionally, the duration of a duration type anchor point locator may be a specified using start time or video frame, and a specified end time or video frame. A plurality of duration type anchor points may even overlap the same portions of the thematic content event 212.

A keyword descriptor is associated with at least one particular anchor point. Each keyword descriptor comprises a unique keyword identifier and at least one keyword.

The keyword identifier is a unique identifier of the keyword descriptor. Thus, each defined keyword descriptor may be uniquely identified from the other keyword descriptors based on their unique keyword identifier. The keyword identifier may be any suitable unique identifier, such as a numeric identifier, an alphabetic identifier, and/or an alpha numeric identifier. Thus, a single keyword descriptor may be uniquely associated with a single anchor point. In an example embodiment, the keyword identifier may be the same as the anchor point identifier.

Alternatively, the keyword identifier and the anchor point identifier may be different from each other. When the keyword identifier and the anchor point identifier are different, they are associated with each other. Thus, a unique keyword descriptor may be uniquely associated with a identifier of a designated anchor point. Further, a selected unique keyword descriptor may be uniquely associated with a plurality of designated anchor point identifiers. Accordingly, keywords of a particular keyword descriptor may be associated with multiple anchor points, and therefore be associated with multiple portions of the thematic content event 212.

Keywords are words or phrases that are descriptive of an attribute of the portion of the thematic content event 212 that has been associated with that particular anchor point. A keyword descriptor may have as few as one keyword, or may have many different keywords.

Any suitable keyword may be used in a keyword descriptor. An example keyword may be related to the subject matter theme of the associated portion of the thematic content event 212. Another example keyword may pertain to some aspect or characteristic of the scene set and/or location where that associated portion of the thematic content event 212 was filmed. Another example keyword may describe some aspect or characteristic of the dialogue, or may be the actual dialogue, of that associated portion of the thematic content event 212. Another example keyword may pertain to some aspect or characteristic of the sound track, such as particular sounds or music, of that associated portion of the thematic content event 212. Another example keyword may be descriptive of an event that was portrayed in the associated portion of the thematic content event 212. Keywords may identify particular actors performing in the associated portion of the thematic content event 212. Keywords may also include interesting trivia pertaining to any of the above-described aspect or characteristic of the portion of the thematic content event 212 that has been associated with the associated anchor point.

In practice, a received thematic content event 212 is processed by defining anchor points for portions or locations of interest in the thematic content event 212, and by defining associated keyword descriptors for the portions or locations of the thematic content event 212 identified by the particular associated anchor point. The modified thematic content generator 210 generates a modified thematic content event 214 that includes the original thematic content event 212, the defined anchor points, and the associated keyword descriptors. The modified thematic content event 214 may then be stored into a suitable memory medium, such as the example modified thematic content storage medium 124 (FIG. 1). In some embodiments, the generated modified thematic content event 214 may be communicated, such as in a media content stream or the like, to another device for storage.

In practice, an operator of the thematic content modify system 122 specifies locations or portions in the thematic content event 212 that are to have an anchor point defined for. Additionally, the operator specify at least one keyword that is to be added to the keyword descriptor for that associated anchor point.

Alternatively, or additionally, a first operator may define anchor points and at a later time a second operator (or even the first operator) may specify the associated keywords separately. Further, the second operator (or even the first operator) may later add new anchor points (and associated keywords), later modify the location information for anchor points, and/or later delete anchor points, to further modify a previously generated modified thematic content event 214.

Figure 3:
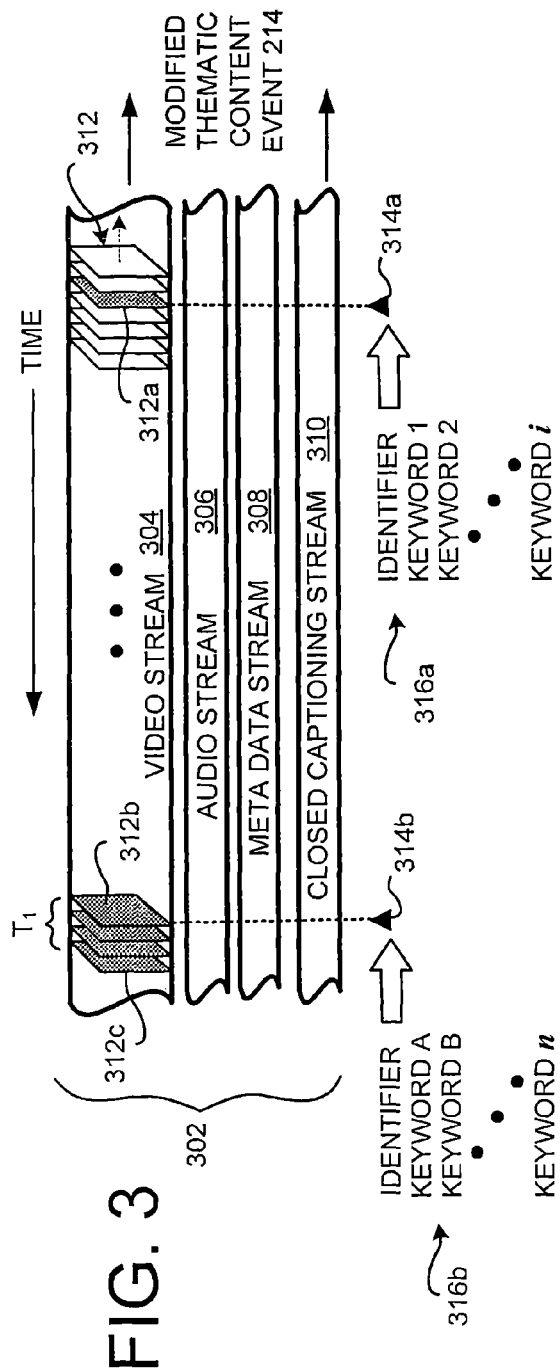
FIG. 3 conceptually illustrates a portion of the modified thematic content event that has been generated by the modified thematic content generator.

FIG. 3 conceptually illustrates a portion of the modified thematic content event 214 that has been generated by the modified thematic content generator 210 (FIG. 2). The portion of the modified thematic content event 214 is conceptually illustrated as a media content stream 302 that communicates, transports, or otherwise carries, the modified thematic content event 214. The media content stream 302 portion of the modified thematic content event 214 comprises a video stream 304, a corresponding audio stream 306, and a corresponding metadata stream 308, and optionally, a closed captioning stream 310.

The video stream 304 is comprised of a plurality of serially sequenced video frames 312. Each video frame 312 has data or information used to render and present a particular image of the thematic content event 212. The video frames 312 are serially presented so as to create a moving picture.

The audio stream 306 may include spoken words, music, and background sounds. The audio stream 306 is sequenced with the video frames 312 such that spoken words, music, and background sounds of the audio stream 306 correspond in time with the moving picture. In an example embodiment, a speech synthesis generator may be used to generate a textual version of the audio stream dialogue (where the generated textual dialogue may be used to compare with keywords).

Some media content streams 302 may include a metadata stream 308 which contains other information of interest pertaining to an associated point in the thematic content event 212. For example, scene identifiers, scene transition identifiers, or the like may be included in the metadata stream 308 for scene identification. Descriptive material describing some aspect or characteristic of an associated point in the thematic content event 212 may be included in the metadata stream 308. For example, but not limited to, actors may be identified, scene themes may be described, and/or subject matter may be described. The metadata may describe artifacts such as a building or an object shown in the scene. The metadata may describe a location of the scene or some aspect or characteristic of the scene set. Any suitable alphanumeric textual information may be used for such descriptive information that is included in the metadata (where the textual metadata may be used to compare with keywords).

An optional closed captioning stream 310 is also conceptually illustrated as part of the media content stream 302. The closed captioning stream 310 is typically a textual presentation of the words of the audio stream 306 for hearing impaired viewers or for viewers in an area with relatively loud ambient noise levels, such as a bar or the like. The text of the closed captioning stream 310 may be in a different language that the language used for the spoken dialogue of the thematic content event 212. The words of the closed captioning stream 310 are sequenced so as to generally correspond to the spoken words of the audio stream 306.

In the various embodiments, the plurality of anchor points are added into the media content stream 302 at a suitable location that corresponds to a particular location in the thematic content event 212. In an example embodiment, anchor points may be added into the frame data. Alternatively, the anchor points may be embedded in or otherwise incorporated into the audio stream 306, the metadata stream 308, and/or the closed captioning stream 310 of the media content stream 302.

FIG. 3 conceptually illustrates a first anchor point 314a that has been associated with a first video frame 312a. Thus, the anchor point location of the anchor point 314a corresponds to the location of the video frame 312a. In the example embodiment, the anchor point locator may be an identifier of the video frame 312a. Alternatively, the anchor point identifier may be a time from start that identifies the location of the video frame 312a in the media content stream 302. This example anchor point 314a also has a unique anchor point identifier that identifies the anchor point 314a from other anchor points.

Further, a first keyword descriptor 316a is conceptually illustrated as being associated with the first anchor point 314a. The first keyword descriptor 316a includes its unique identifier, and includes keyword 1 through keywords i. Accordingly, the one or more keywords 1-i are associated with the location of the first anchor point 314a since the keyword identifier of the first keyword descriptor 316a corresponds to, or is the same as, the unique anchor point identifier of the first anchor point 314a. Further, because the anchor point location of the first anchor point 314a is associated with the known location of the first video frame 312a, the keywords 1-i are associated with the known location of the first video frame 312a, and thus, with the portion of the thematic content event 212 which the first video frame 312a is depicting.

FIG. 3 further conceptually illustrates a second anchor point 314b that has been associated with a duration $T_1$ of the thematic content event 212 beginning with the second video frame 312b. Thus, the anchor point location of the anchor point 314b corresponds to the beginning location of the portion of the video frame 312b, which may be identified by its identifier or a time from start. The duration $T_1$ is identified by a specified duration as measured from the location of the video frame 312b. Alternatively, the duration $T_1$ may be determinable by the location of the last frame 312c.

Further, a second keyword descriptor 316b is conceptually illustrated as being associated with the second anchor point 314b. The second keyword descriptor 316b includes its unique identifier, and includes keyword A through keywords n. Accordingly, the one or more keywords A-n are associated with the location of the second anchor point 314b since the identifier of the second keyword descriptor 316b corresponds to, or is the same as, the unique identifier of the second anchor point 314b. Further, because the anchor point location of the second anchor point 314b is associated with the known location of the duration $T_1$, here beginning at with the second video frame 312b, the keywords A-n are associated with the known location of the second video frame 312b, and thus, with the portion of the thematic content event 212 which the duration $T_1$ is depicting.

In an example embodiment, the plurality of keyword descriptors may be stored in a keyword descriptor database. Such a keyword descriptor database may be separately stored from the media content stream 302. The information in the keyword descriptors may be stored in a relational database (wherein the keyword identifier is related to the anchor point identifier, and wherein the keyword identifier is related to the associated one or more keywords). In such embodiments, the data stored in the keyword descriptor database may be modified without having to access the modified thematic content event 214. Keywords may be added or deleted. Because the unique keyword identifier (which is not changed or modified) is associated with the corresponding unique anchor point identifier, modifications made to the keywords of the keyword descriptor will not affect the location relationship between the keywords of the keyword descriptor and the associated portion of the modified thematic content event 214.

Alternatively, the keyword descriptors may be added into the media content stream 302 at a suitable location that corresponds to a particular location in the anchor point. For example, the keyword descriptors may be embedded in or otherwise incorporated into the audio stream 306, the metadata stream 308, and/or the closed captioning stream 310 of the media content stream 302.

In some embodiments, the anchor point locator is the actual location of the embedded anchor point in the media content stream 302. Alternatively, location information identifying a particular location (or duration) may be stored as data in an anchor point database. That is, the unique anchor point identifier and the information for the anchor point locator may be stored in an anchor point database, or may be stored in the same database that is storing the keyword descriptors. For example, the location information for the anchor point locator may be a frame ID, a scene ID, or a specified time from the start of the thematic content event 212. Thus, the anchor point stored in the anchor point data base would be the unique anchor point identifier assigned to the anchor point and the frame ID, scene ID, or time from start. A duration and or a duration end time may also be included as part of the anchor point data that is stored in the anchor point database to define a duration. In such embodiments, anchor points may be added (assuming that the requisite location information is determinable in some manner) and/or may be deleted without having to access the thematic content event 212.

In practice, the operator views the received thematic content event 212 using the operator interface 202 (FIG. 2). At some point of interest in the thematic content event 212 that has been identified by the operator, and based on anticipation by the operator that a portion of a conversation video may have discussion relating to that point in the thematic content event 212, the operator provides a suitable input to the operator interface 202. In response to the operator's input, the anchor point adder 206 generates an anchor point and adds the generated anchor point into the received thematic content event. Alternatively, the anchor point adder 206 may generate the anchor point identifier and use the associated location identifier of the location in the thematic content event 212 (such as the frame ID, the scene ID and/or the time from start) to define the anchor point information, which is then stored in the anchor point database.

Additionally, or optionally, the operator may then specify one or more keywords that are to be associated with a particular anchor point. For example, the operator may initiate generation of the anchor point. Then, the operator may then next specify one or more keywords. The keyword descriptor adder 208 would then generate a keyword identifier and associate it with the anchor point identifier of the generated anchor point. Then, the specified one or more keywords with the keyword descriptor identifier are stored in the keyword descriptor database.

As anchor points are generated, and as keyword descriptors are optionally defined for generated anchor points, the modified thematic content generator generates the modified thematic content event 214. Once the processing of the thematic content event 212 has been completed, the generated modified thematic content event 214 includes a modified version of the thematic content event 212 that includes the generated anchor points and the keyword descriptor database.

E. Member Dialogue Video

In the various embodiments, the conversation video is generated by the video community system 100 using selected video and/or audio commentary, or portions thereof, that have been received from the example user 104 (FIG. 1), from a plurality of other community members (not shown) who have also viewed the thematic content event, or from other individuals (not shown) that are knowledgeable about the thematic content event. Various systems and methods used by a member video and content generator 102 are configured to receive the member dialogue videos that are used to generate the conversation video. A member dialogue video comprises video and audio information that expresses the personal opinions and/or personal viewpoint of the community member about a particular thematic content event. That is, the audio portion of the member dialogue video verbally expresses at least one of a personal opinion and a personal viewpoint about the thematic content event.

Figure 4:
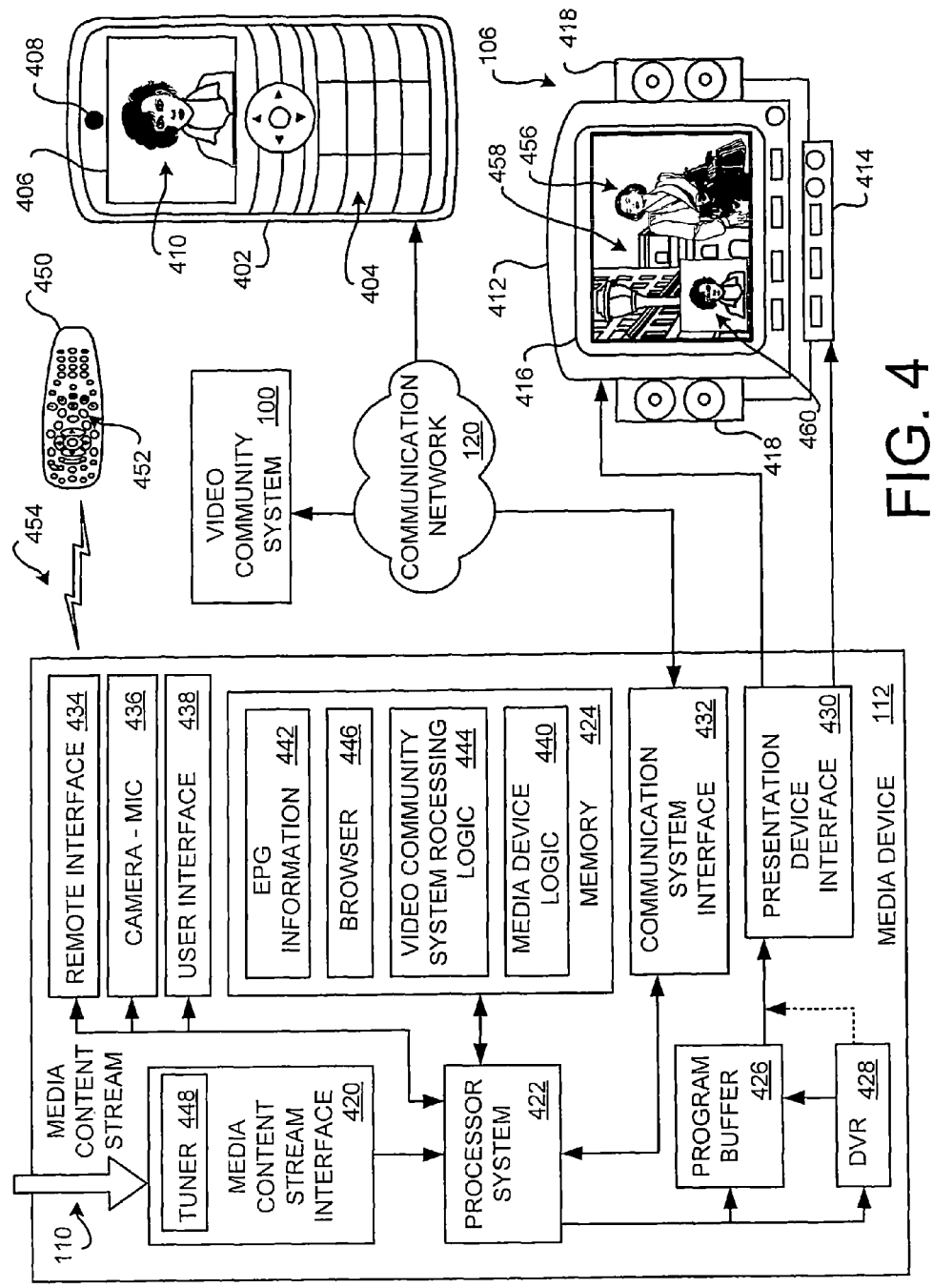
FIG. 4 is a block diagram illustrating an example media device and a mobile device that are configured to generate the video and/or audio commentary that is communicated to the video community system.

FIG. 4 is a block diagram illustrating an example media device 112 and a mobile device 402 that are configured to generate the video and/or audio commentary, referred to as a member dialogue video. Here, the media device 112 and the mobile device 402 are embodiments of the member video and content generator 102. A generated member dialogue video is then communicated to the video community system 100.

An image capture device (video camera) and an audio capture device (microphone) are used to acquire a community member's (the user's) video and audio commentary about a particular thematic content event. In practice, community members, such as the user 104, view a thematic content event (or the modified thematic content event). After the conclusion of the presentation of the thematic content event to the user 104, or even during presentation of the thematic content event, the user 104 may operate the media device 112 and/or the mobile device 402 to acquire their video and/or audio commentary pertaining to the viewed thematic content event The device 112, 402 is configured to communicatively couple, via a communication connection or a communication link established with the video community system 100 via the communication network 120. Accordingly, the member dialogue video (the acquired video and/or audio commentary) may be communicated to the video community system 100 for storage. An example embodiment of the video community system 100 receives the member dialogue video at the member interface 138. The member dialogue video is saved into the community commentary information storage medium 140 at the video community system 100 for later processing by the conversation content generator 126.

The communicated member dialogue video additionally includes information that identifies the user 104. Thus, when the video community system 100 constructs a conversation video, the identity of the user 104 is determinable. The identity information of the user may be the user's name, nickname, user handle, or the like that has been stored by the media device 112 or the mobile device 402. Other suitable identifiers may be used. For example, the phone number of the user may be included in the conversation video when the mobile device 402 is a cellular phone. In some embodiments, when a communication connection or link is established between the devices 112, 402 and the video community system 100, information identifying the device 112, 402 may be associated with the identity of the user 104. For example, a serial number of the device 112, 402 may be associated with the name or the like of a community member in a database residing at the video community system 100. Such a database may reside at another suitable location. As other non-limiting examples, the devices internet protocol (IP) address, a uniform resource locator or the like may be used to identify the user 104.

In some situations, if the user's member dialogue video, or a portion thereof, is incorporated into a generated conversation video, the identity of the user 104 may be indicated in the conversation video. For example, the audio portion of the conversation video may audibly present the name of the user 104 before, or after, the user's video and/or audio commentary is presented. Alternatively, or additionally, the name of the user 104 may be textually indicated during presentation of the conversation video. For example, a banner or other text box may be presented while the video and/or audio commentary of that particular user 104 is being presented in the conversation video.

The member dialogue video presents an opinion or a personal viewpoint that the user 104 has concerning the viewed thematic content event. The user 104 may verbally articulate their likes and/or dislikes about the thematic content event in general, about one or more particular scenes, about the performance of one or more actors of the thematic content event, about various attributes or characteristics of the film set where the thematic content event was filmed, about their reaction to the theme or subject matter of the thematic content event, or about any other aspect, characteristic, or point of interest of the thematic content event. Further, a member dialogue video may be relatively long or may be relatively short.

For example, the mobile device 402 may be provisioned with a plurality of controllers 404, such as buttons, switches or the like, a display 406, and a camera/microphone device 408. The user 104 actuates one or more of the controllers 404 to cause the mobile device 402 to operate the camera/microphone device 408 to capture an image 410 of the user 104 and to concurrently acquire the user's audio commentary about the viewed thematic content event that is spoken by the user 104.

Examples of the mobile device 402 include cellular phones equipped with video functionality, personal device assistants (PDAs), note pads, or portable personal computers (PCs) that are configured to acquire video and/or audio commentary. Optionally, the mobile device 402 may be configurable to present a thematic content event that is received in a media content stream on its display 406.

In an example embodiment, the acquired video and/or audio commentary is stored in a memory (not shown) of the mobile device 402 until the user 104 has decided to end their commentary about the thematic content event. Then, the user 104 may review the stored video and/or audio commentary. The stored video and/or audio commentary may be revised or edited by the user 104 as desired. Then, the acquired video and/or audio commentary may be communicated from the mobile device 402 to the video community system 100.

Alternatively, or additionally, the mobile device 402 may establish a connection or link to the video community system 100 before the user initiates their video and/or audio commentary. Accordingly, the user's video and/or audio commentary is communicated to the video community system 100 as it is being captured live by the camera/microphone device 408 of the mobile device 402.

In some instances, the video and/or audio commentary may be acquired while the user 104 is viewing the presented thematic content event. When the user 104 wants to add to their video and/or audio commentary, the user 104 may pause presentation of the thematic content event while the thematic content event video and/or audio commentary is being acquired. When the user 104 has finished their input, presentation of the thematic content event is resumed. In embodiments where the thematic content event is being presented on a display controlled by the device 112, 402 that is acquiring the user's video and/or audio commentary, the device 112, 402 may be configured to automatically pause presentation of the thematic content event when the user 104 initiates input of their thematic content event video and/or audio commentary, and then automatically resume presentation when the user 104 stops their commentary input.

For example, the user 104 may be viewing the thematic content event on the display 406 of their cell phone 402. When the user 104 actuates one or more of the controllers 404, the cell phone 402 begins to acquire the video and/or audio commentary using the camera/microphone device 408 while concurrently pausing presentation of the thematic content event. In some situations, the media device 112 may be presenting the thematic content event on the controlled media presentation system 106. The mobile device 402, if communicatively coupled to the example media device 112, may communicate a message or the like to the media device 112 which causes the media device 112 to pause presentation of the thematic content event.

In some embodiments, the media device 112 may be configured to acquire the video and/or audio commentary of the user 104. FIG. 4 further presents a block diagram of selected elements of the media device 112. An exemplary media device 112 is a set top box (STB). Embodiments of media device 112 may include, but are not limited to, stereos, surround-sound receivers, radios, televisions (TVs), digital video disc (DVD) players, digital video recorders (DVRs), game playing devices, or personal computers (PCs) that are configured to present a video-based thematic content event that is received in a media content stream 110.

The exemplary media device 112 is communicatively coupled to the media presentation system 106 that includes a visual display device 412, such as a television (hereafter, generically a TV), and an audio presentation device 414, such as a surround sound receiver controlling an audio reproduction device (hereafter, generically, a speaker). Other types of output devices may also be coupled to the media device 112, including those providing any sort of stimuli sensible by a human being, such as temperature, vibration and the like. The video portion of the media content event is displayed on the external display 416 and the audio portion of the media content event is reproduced as sounds by one or more speakers 418. In some embodiments, the media device 112 and one or more of the components of the media presentation system 106 may be integrated into a single electronic device.

The non-limiting exemplary media device 112 comprises a media content stream interface 420, a processor system 422, a memory 424, a program buffer 426, an optional digital video recorder (DVR) 428, a presentation device interface 430, a communication system interface 432, a remote interface 434, a camera/microphone 436 (Camera/MIC), and an optional user interface 438. The memory 424 comprises portions for storing the media device logic 440, the electronic program guide (EPG) information 442, the video community system processing logic 444, and an optional browser 446. In some embodiments, the media device logic 440, the browser 446, and the video community system processing logic 444 may be integrated together, and/or may be integrated with other logic. In other embodiments, some or all of these memory and other data manipulation functions may be provided by and using remote server or other electronic devices suitably connected via the Internet or otherwise to a client device. Other media devices (such as, but not limited to the example mobile device 402) may include some, or may omit some, of the above-described media processing components. Further, additional components not described herein may be included in alternative embodiments.

As noted above, a user 104 may wish to view a thematic content event of interest. That is, based upon the user's commands, the media device 112 can then control itself and/or the various media devices that it is communicatively coupled to, such as the components of the media presentation system 106, in accordance with the generated user commands.

The functionality of the media device 112, here a set top box, is now broadly described. A media content provider provides media content that is received in one or more multiple media content streams 110 multiplexed together in one or more transport channels. The transport channels with the media content streams 110 are communicated to the media device 112 from a media system sourced from a remote head end facility (not shown) operated by the media content provider. Non-limiting examples of such media systems include satellite systems, cable system, and the Internet. For example, if the media content provider provides programming via a satellite-based communication system, the media device 112 is configured to receive one or more broadcasted satellite signals detected by an antenna (not shown). Alternatively, or additionally, the media content stream 110 can be received from one or more different sources, such as, but not limited to, a cable system, a radio frequency (RF) communication system, or the Internet.

The one or more media content streams 110 are received by the media content stream interface 420. One or more optional tuners 448 residing in the media content stream interface 420 selectively tune to one of the broadcast-type media content streams 110 in accordance with instructions received from the processor system 422. Other components (not shown) may alternatively, or additionally, reside in the content stream interface 420 to receive other types of media content streams 110.

The processor system 422, executing the media device logic 440 and based upon a request for a thematic content event of interest specified by a user, parses out media content associated with the thematic content event of interest. The thematic content event of interest is then assembled into a stream of video and/or audio information which may be stored by the program buffer 426 such that the video and audio content can be streamed out to components of the media presentation system 106, such as the visual display device 412 and/or the audio presentation device 414, via the presentation device interface 430. Alternatively, or additionally, the parsed out media content may be saved into the DVR 428 for later presentation. The DVR 428 may be directly provided in, locally connected to, or remotely connected to, the media device 112. In alternative embodiments, the media content streams 110 may stored for later decompression, processing and/or decryption.

From time to time, information populating the EPG information 442 portion of the memory 424 is communicated to the media device 112, via the media content stream 110 or via another suitable media. The EPG information 442 stores the information pertaining to the scheduled programming that includes the thematic content event of interest. The information may include, but is not limited to, a scheduled presentation start and/or end time, a program channel, and descriptive information. The program's descriptive information may include the title of the program, names of performers or actors, date of creation, and a summary describing the nature of the program. Any suitable information may be included in the program's supplemental information. Upon receipt of a command from the user 104 requesting presentation of an EPG display, the information in the EPG information 442 is retrieved, formatted, and then presented on the display 416 as an EPG.

In some embodiments, those particular thematic content event listed in the EPG that have one or more associated conversation videos may be identified as such in the EPG. The availability of a conversation video may be indicated by a suitable color of shading, sect color, text font, text underlining, text bolding or the like. Some embodiments may include a suitable icon on a presented EPG. In some embodiments, the presented EPG icon may be selectable by the user 104. In such embodiments, selection of the EPG icon may cause the media device 112 to become configured to receive a user's input conversations on one or more topics pertaining to the thematic content event (the member dialogue video).

The associated conversation video may be directly accessed from the EPG in some embodiments. For example, selection of a presented EPG icon may cause automatic presentation of the conversation video. In another embodiment, section of a particular thematic content event listed in the EPG may cause presentation of a pop-up window or the like that permits the user to select between presentation of the thematic content event or the associated conversation video.

The exemplary media device 112 is configured to receive commands from the user 104 via a remote control 450. The remote control 450 includes one or more controllers 452. The user 104, by actuating one or more of the controllers 452, causes the remote control 450 to generate and transmit commands, via a wireless signal 454, to the media device 106. The commands control the media device 112 and/or control the media presentation devices 128. The wireless signal 454 may be an infrared (IR) signal or a radio frequency (RF) signal that is detectable by the remote interface 434.

The processes performed by the media device 112 relating to the processing of the received media content stream 110 and communication of a presentable media content event to the components of the media presentation system 106 are generally implemented by the processor system 422 while executing the media device logic 440. Thus, the media device 112 may perform a variety of functions related to the processing and presentation of one or more media content events, the thematic content event, and/or the conversation video that is received in the media content stream 110 or that is received at the communication interface 432.

The example media device 112 optionally includes the camera/microphone 436. The camera/microphone 436 is an image capture device and a sound capturing device that is operable to capture the video and/or audio commentary made by the user when a member dialogue video is being made. Alternatively, or additionally, the camera/microphone 436, and/or one or more components therein, may be external devices or appliances communicatively coupled to the media device 112. For example, a remote camera and/or microphone may be communicatively coupled to the media device wirelessly, or using a suitable wire connector. In some embodiments, the camera/microphone 436 may be components of another device, such as the mobile device 402, a video recorder, the remote control 450, a notepad, a laptop computer, a personal computer, a personal device assistant (PDA), or the like.

The user interface 438 is configured to receive input from the user. For example, the user may input their identifying information that is incorporated into the member dialogue video via the user interface 438. Alternatively, the user may input a request for a particular conversation video by specifying a thematic content event of interest. In an example embodiment, the user interface include various controllers (not shown) that are accessible by the user 104. Alternatively, or additionally, the user interface 438 may be configured to communicatively couple to another device, such as a keyboard device, a touchpad device, a mouse device, or the like.

When the user 104 is viewing a proof video of another community member, the user 104 may wish to provide an affirmation vote or a denial of affirmation vote for that community member. An actuator, such as a button, toggle or the like may reside on the surface of the user interface 438 so that the user 104 may select their vote. In some embodiments, the remote control 450 may be configured to permit the user 104 to make an affirmation vote or a denial of affirmation vote. A suitable pop up screen or the like may be used to graphically indicate the user's vote selection.

FIG. 4 further conceptually illustrates an image of a scene in a thematic content event that the user has selected for presentation. Here, the image shows an actress 456 looking at one of a plurality of buildings 458. During presentation of the scene, the user 104 may be particularly pleased with the performance and/or appearance of the actress 456. The user may decide to provide their video and/or audio commentary about the impression (personal views) to the community by generating a member dialogue video. The example camera/microphone 436 captures the user's audio commentary while an image of the user 104 is concurrently captured. During capture of the member dialogue video, an image 460 of the user 104 may optionally be shown on the display 416 using any suitable format, such as a picture over picture format, a picture in picture format, a split screen format, a full screen format, or the like, wherein the presented scene is relatively smaller than the view field of the display. Once the user 104 has completed making their commentary, the resultant member dialogue video is then communicated to the video community system 100.

F. Member Rant Video

As described herein, a proof video presents commentary from one or more community recognized experts. The proof video presents opinions and views of a particular community member about a particular thematic content event and/or a particular genre and/or topic pertaining to the thematic content event. The proof video is a tool whereby the generating community member may become recognized by the community as being an expert in (based upon received affirmation votes and/or denial of affirmation votes received from other community members).

Before a community member is recognized (before receiving received affirmation votes and/or denial of affirmation votes from other community members), the submitting community member generates a member rant video that presents their opinions and/or views about a particular thematic content event and/or a particular genre and/or topic pertaining to the thematic content event for which they would like to become deemed by the community as being an expert in. That is, before becoming a recognized expert, the submitting community member must submit their member rant video to the video community system 100. Then, the submitting community member must receive a sufficient number of affirmation votes, and/or obtain a sufficient ratio of affirmation votes to denial of affirmation votes, from other community members. Accordingly, the other voting community members need to view the member rant video, and then vote for affirmation, or vote against affirmation, based on their opinion of the member rant video.

Because the objective of a member rant video is to persuade community members that the submitting community member should be recognized as an expert in the community as having a special skill and/or knowledge. Accordingly, the member rant video is preferably a passionate monologue that is made by the submitting community member that demonstrates their high degree of skill or knowledge about a particular thematic content event and/or a particular genre and/or topic pertaining to the thematic content event.

A community member may generate their member rant video using the device 112/402 described in FIG. 4. To initiate generation of a member rant video, the submitting community member provides an input that identifies their recording of their commentary (video and/or audio commentary) as being a member rant video.

A member rant video may be directed to any topic that the submitting community member believes will help establish their expertise in a particular thematic content event and/or a particular genre and/or topic pertaining to the thematic content event. The submitting community member may articulate their opinion about a particular thematic content event, their opinion about a particular scene of the thematic content event, and/or their opinion about a theme of the thematic content event. The member rant video preferably includes recitation of one or more concrete facts about the thematic content event in support of the submitting community member's opinion.

As another non-limiting example, a member rant video may present an opinion about a particular actor. The submitting community member's opinion may be based on a single thematic content event or a plurality of different thematic content events that the actor was in. The member rant video preferably includes recitation of one or more concrete facts about the actor in support of the community member's opinion.

Once the member rant video has been generated, the member rant video is communicated to the video community system 100. An example embodiment of the video community system 100 receives the member rant video at the member interface 138. The member rant video is saved into the community commentary information storage 140 at the video community system 100 for later processing by the conversation content generator 126

G. Producer Dialogue Video

Similar to a member dialogue video, a producer dialogue video presents opinions of, views of, and/or information known by, a producer or other knowledgeable person about a particular thematic content event and/or a particular genre and/or topic pertaining to the thematic content event. For example, the producer may be verbally providing information of interest, such as a fact or the like, pertaining to some aspect or characteristic of a particular scene, or portion thereof, in the thematic content event. Accordingly, the producer or other knowledgeable person may participate in the community discussion when their producer dialogue video, or a portion thereof, is included in a generated conversation video.

In an example embodiment, the video portion of the producer dialogue video shows the producer or other knowledgeable person discussing their viewpoint or opinion, thereby emulating a person-to-person conversation between the viewing user 104 and the producer or other knowledgeable person making the producer dialogue video.

In an example embodiment, the producer dialogue video is a relatively short presentation of video and/or audio commentary of the producer or other knowledgeable person. Thus, a plurality of relatively small producer dialogue videos may be generated, wherein each producer dialogue video pertains to a specified scene and/or topic of the thematic content event. Such producer dialogue videos are in contrast with prior art director cuts, which are typically audio commentary that is made over the course of the entirety of the thematic content event, and which replaces the audio sound track of the thematic content event. That is, the audio portion of a producer dialogue video does not replace portions of the soundtrack of the thematic content event, and portions of the included video portion of a producer dialogue video are different from the corresponding video portion of the thematic content event.

The commentary (video and/or audio commentary) of the producer dialogue video may be created by the device 112, 402, or a similarly configured electronic device (having an image capture/audio capture device, and a way to communicate or store the generated producer dialogue video). A producer dialogue video is communicated to the video community system 100 for optional inclusion in a generated conversation video. An example embodiment of the video community system 100 receives the producer dialogue video at the producer interface 136. The producer dialogue video is saved into the community commentary information storage 140 at the video community system 100 for later processing by the conversation content generator 126.

Alternatively, or additionally, the thematic content modify system 122 (FIG. 2) may be provisioned with the camera/microphone 436 or similar device. The producer dialogue video may be incorporated into the modified thematic content event or may be separately communicated to the video community system 100 (with an associating identifier that associates the producer dialogue video with the thematic content event that pertains to the commentary of the producer dialogue video).

When the producer or other knowledgeable person is creating the producer dialogue video, the producer dialogue video or portions thereof may be associated with one or more anchor points. Accordingly, one or more relatively small producer dialogue videos may be associated with a particular anchor point. Thus, the producer dialogue video is associated to a specified scene, topic, and/or location of the thematic content event.

Alternatively, or additionally, one or more keywords may be associated with a producer dialogue video. The associated keywords are later used by the video community system 100 to facilitate generation of a conversation video. The associated keywords may be later correlated with the anchor point keywords, and thus become associated with a particular scene, topic, and/or location in the thematic content event.

In some situations, the producer dialogue video may include portions of selected scenes in the thematic content event. For example, a picture over picture format, a picture in picture format, a split screen format, a full screen format, or the like, wherein the presented scene is relatively smaller than the view field of the display presenting an image of the speaker. Alternatively, images of the current speaker may be relatively smaller than the view field of the display that is presenting the scene.

Individuals that might create a producer dialogue video include producers of the film and other parties, such as actors, directors, editors, screen writers, film critics, and/or soundtrack composers. Multiple individuals may cooperatively work together to create a producer dialogue video.

The producer dialogue video may include video from other sources, such as other thematic content events or a specially created video. Alternatively, or additionally, the producer dialogue video may include selected audio from other sources, such as a special soundtrack or other music.

H. Endorsement Video

A proof video commentary presents opinions and views of a particular recognized community member about a particular thematic content event and/or a particular genre and/or topic pertaining to the thematic content event. The community member may have been deemed by the community as being an expert in (based upon received affirmation votes and/or denial of affirmation votes received from other community members). To obtain recognition, the submitting community member generates a member rant video. To bolster the persuasiveness of a particular member rant video, a producer or other knowledgeable person may generate an endorsement video. The endorsement video may be incorporated into the submitting community member's rant video.

For example, the director of a thematic content event and/or one or more actors in the thematic content event may be familiar with the submitting community member. They may have a high opinion of the submitting community member, and thus wish to see that submitting community member become a recognized expert. Accordingly, the director and/or actor may generate an endorsement video that presents their favorable opinion of the submitting community member. Preferably, the director and/or actor are notoriously well known and respected by the community members.

When other community members view a proof video that includes the submitting member's rant video, and that further includes one or more endorsement videos, the added endorsement videos may further influence the community member to give an affirmation vote to the submitting community member. For example, a community member may somewhat like the member's proof video, but may not be persuaded enough to give the submitting community member an affirmation vote. However, if the famous actor John Smith has prepared an endorsement video included in the member proof video that supports the submitting community member, then the community member viewing the submitting member's proof video may then become sufficiently persuaded to give the submitting community member an affirmation vote.

The endorsement video may be created by the device 112, 402, or a similar electronic device. Alternatively, or additionally, the thematic content modify system 122 (FIG. 2) may be provisioned with the camera/microphone 436 or similar device so that an endorsement video may be generated using the content modify system 122. The endorsement video is communicated to the video community system 100 for optional inclusion in a member proof video.

An example embodiment of the video community system 100 receives the endorsement video at the producer interface 136. The endorsement video is saved into the community commentary information storage 140 at the video community system 100 for later processing by the conversation content generator 126.

I. Association of Dialogue Videos with Thematic Content Events

When a conversation video is to be generated by the conversation content generator 126, an emulated conversation is generated based on received member dialogue videos, and optionally the producer dialogue videos, that pertain to a particular thematic content event. In view that there are many different thematic content events for which a conversation video will be generated, one skilled in the art appreciates that the many received member dialogue videos and producer dialogue videos must be correctly associated with the particular thematic content event that the conversation content generator 126 is generating the conversation video generated for. That is, if a particular member dialogue video pertains to the thematic content event "A" and does not related to other thematic content events, then when the conversation content generator 126 generates the conversation video for the thematic content event "A", that particular member dialogue video is a candidate for inclusion in the generated conversation video. On the other hand, when the conversation content generator 126 generates a conversation video for a different one of the thematic content events, that particular member dialogue video is not a candidate for inclusion in the generated conversation video. Accordingly, a first problem solved by embodiments of the video community system 100 is correctly associating each received member dialogue video and each received producer dialogue video with at least one particular thematic content event.

In some situations, a received one of the member dialogue videos and/or producer dialogue videos may pertain to multiple thematic content events. Accordingly, embodiments of the video community system 100 correctly associate some received member dialogue videos and received producer dialogue videos with a multiple thematic content events.

Further, once a particular member dialogue video or producer dialogue video has been correctly associated with a particular thematic content event(s), then the pertinent location that the member dialogue video or producer dialogue video is commenting upon must be identified. For example, if a particular portion of a generated conversation video is presenting commentary on a particular scene, then those member dialogue videos or producer dialogue videos that provide commentary on that particular scene should be selected and grouped together in that particular portion of the conversation video.

For example, commentary relating to the conclusion of a thematic content event should occur preferably in one place in the conversation video, and preferably at the end of the conversation video. Otherwise, the continuity of the emulated conversation will seem unnatural to the user 104 viewing the conversation video. To further illustrate, in a member dialogue video providing commentary on the opening scene of the thematic content event is included in the emulated conversation about the conclusion of the thematic content event, then the flow of the emulated conversation will likely become disrupted, and therefore may become distracting or displeasing to the user 104. Accordingly, a second problem solved by embodiments of the video community system 100 is correctly associating each received member dialogue video and each received producer dialogue video (or portions thereof) with a particular relevant location within the thematic content event.

Figure 5:
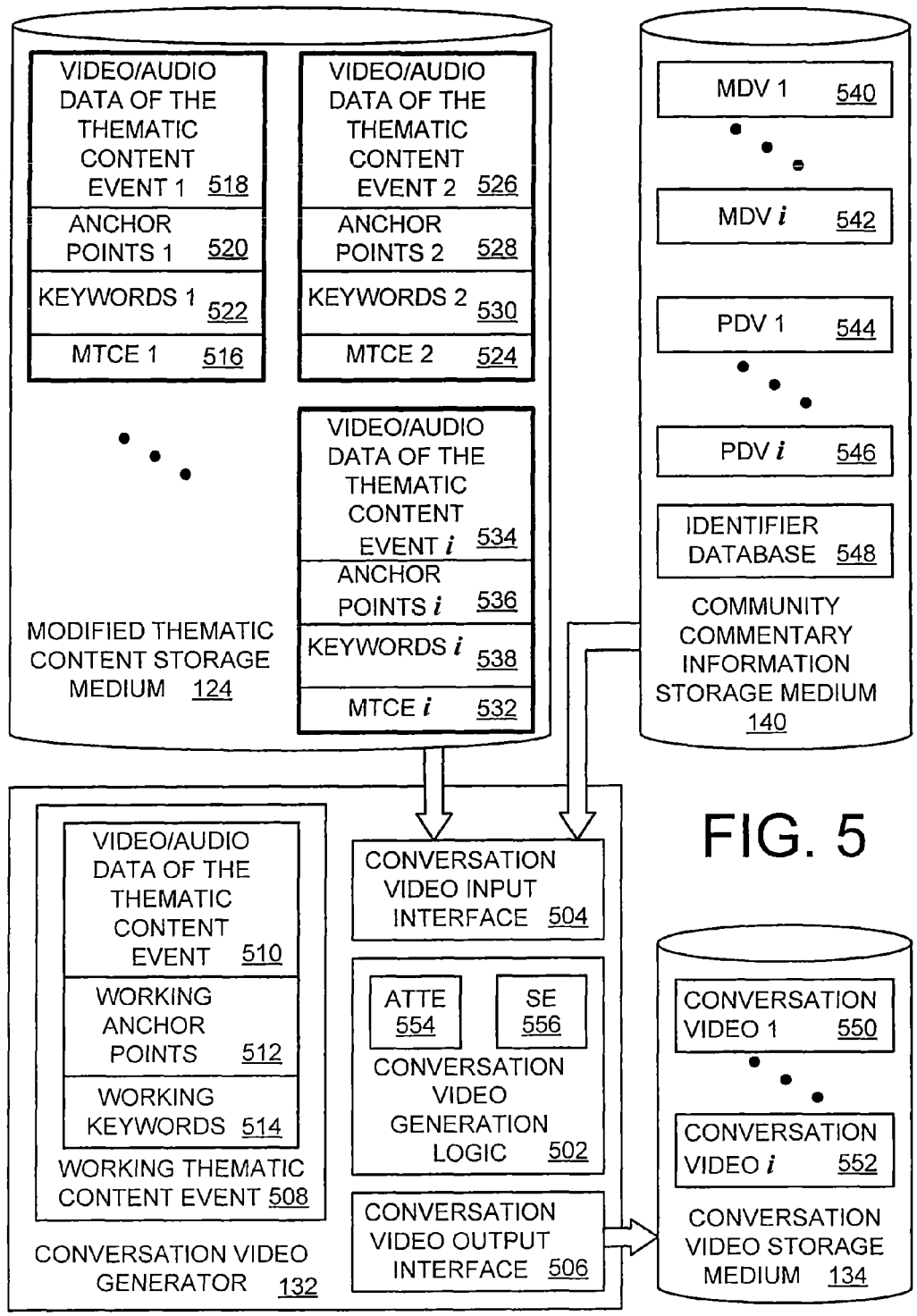
FIG. 5 is a block diagram of the conversation video generator, the modified thematic content storage medium, the community commentary information storage medium, and the conversation video storage medium.

FIG. 5 is a block diagram of the conversation video generator 132, the modified thematic content storage medium 124, the community commentary information storage medium 140, and the conversation video storage medium 134. The conversation video generator 132 comprises the conversation video generation logic 502, a conversation video input interface 504, a conversation video output interface 506, and a working thematic content event 508. The working thematic content event 508 comprises video/audio data of the thematic content event 510, working anchor points 512, and working keywords 514.

The modified thematic content storage medium 124 stores a plurality of modified thematic content events, illustrated as modified thematic content event 1 through modified thematic content event i. The first modified thematic content event 516 (illustrated as "MTCE 1") includes the video/audio data of the thematic content event 518, a plurality of anchor points 520 (illustrated as "anchor points 1"), and a plurality of keywords 522 (illustrated as "keywords 1"). Similarly, the second modified thematic content event 524 (illustrated as "MTCE 2") includes the video/audio data of the thematic content event 526, a plurality of anchor points 528 (illustrated as "anchor points 2"), and a plurality of keywords 530 (illustrated as "keywords 2"). Finally, a last one of the plurality of modified thematic content events 532 (illustrated as "MTCE i") includes the video/audio data of the thematic content event 534, a plurality of anchor points 536 (illustrated as "anchor points i"), and a plurality of keywords 538 (illustrated as "keywords i"). In alternative embodiments, one or more of the modified thematic content events may be stored in a distributed fashion using other memory mediums The community commentary information storage medium 140 stores a plurality of member dialogue videos, illustrated as the first member dialogue video 540 (illustrated as "MDV 1") through a last member dialogue video 542 (illustrated as "MDV i"), and a plurality of producer dialogue videos, illustrated as the first producer dialogue video 544 (illustrated as "PDV 1") through a last producer dialogue video 546 (illustrated as "PDV i"). The community commentary information storage medium 140 further includes the identifier database 548 that stores an identifier for each of the stored member dialogue videos and producer dialogue videos. Further, the identifier includes an association between the member dialogue videos and/or the producer dialogue videos with one or more thematic content events. In alternative embodiments, one or more of the member dialogue videos, producer dialogue videos, and/or the information in the identifier database 548 may be stored in a distributed fashion using other memory mediums.

The conversation video storage medium 134 stores a plurality of generated conversation videos, illustrated as the first conversation video 550 (illustrated as "conversation video 1") through a last conversation video 552 (illustrated as "conversation video i"). In alternative embodiments, one or more of the conversation videos may be stored in a distributed fashion using other memory mediums.

When each member dialogue video or producer dialogue video is received at the conversation video input interface 504, embodiments of the conversation content generator 126, executing audio-to-text translation engine 554 (ATTE) of the conversation video generation logic 502 (using the processing system 142 or another suitable processor system), accesses the audio portion of the member dialogue video or producer dialogue video. An audio to text conversion is performed by the ATTE 554 wherein the verbal commentary in the member dialogue video or producer dialogue video is converted to text.

Then, the text of the member dialogue video or producer dialogue video is compared to the keywords of each of the plurality of modified thematic content events by a text-based search engine 556 (SE) of the conversation video generation logic 502. Embodiments of the video community system 100 may use any suitable text-based search engine 556. The text-based search engine 556 is an engine that compares text of a first element with words of a plurality of second elements. Here, the first element is an analyzed member dialogue video or producer dialogue video where the text has been determined by the ATTE 554 based on the dialogue on the commentary of the analyzed member dialogue video or producer dialogue video. The plurality of second search elements are the plurality of generated modified thematic content events having a plurality of predetermined keywords (associated with anchor points). Thus, the determined text of the analyzed member dialogue video or producer dialogue video is compared with the keywords of one or more of the modified thematic content events.

When a sufficient number of words in the text of the analyzed member dialogue video or producer dialogue video match with the keywords of a particular modified thematic content event, then the analyzed member dialogue video or producer dialogue video is then associated with that particular modified thematic content event. In the various embodiments, each of the member dialogue videos or producer dialogue videos are given a unique identifier. Each of the modified thematic content events also have unique identifiers. Thus, when a match is identified, the unique identifier of the member dialogue video or producer dialogue video is associated with the unique identifier of the matching modified thematic content event, and the matching pair of unique identifiers permits later generation of a conversation generator.

For example, community member John Smith may generate a member dialogue video that is communicated to the video community system 100. The dialogue of John Smith's member dialogue video is converted to text. At some point in the dialogue of the member dialogue video, John Smith may have spoken the title of the particular thematic content event that he is discussing. Here, the text-based search engine 556 is configured to identify the words of the title of the particular thematic content event that John Smith is commenting on, and then match the spoken words of the title with the same title of the modified thematic content event (because example keywords of the modified thematic content event include its title).

Additionally, or alternatively, John Smith may have spoken about one or more attributes of a particular scene in a particular thematic content event (without mentioning the title of the thematic content event). For example, John Smith may have spoken the names of actors in the theme, described one or more particular events occurring in the scene, described a particular theme about the subject matter of the scene, and/or described one or more characteristics of the scene setting. Here, during generation of the modified thematic content events, keywords have preferably been defined for scenes that John Smith may have spoken about in his member dialogue video. Accordingly, the text-based search engine 556 is configured to identify the words John Smith may have spoken about, and then match the spoken words of the plurality of keywords of the same modified thematic content event (because example keywords of the modified thematic content event include its words that correspond to the various attributes of the scene). When there are a sufficient number of matches between the words spoken by John Smith during his discussion of the thematic content event with keywords in a plurality of thematic content events, a match with the particular subject thematic content event may be determined with a sufficient degree of reliability to conclude that the subject thematic content event has been identified.

In practice, the ATTE 554 receives each member dialogue video or producer dialogue video and determines text (words) of the dialogue therein. Optionally, the text-based search engine 556 may identify and omit, or otherwise ignore, insignificant or less significant words from the determined text. For example, words such as "and", "or", "a", "an" or the like are not likely to meaningfully contribute to the word searching process performed by the text-based search engine 556. Thus, the text-based search engine 556 may include and/or access a list of predefined words and/or phrases that will not be used in the search process. Searching can then proceed based on remaining text. Any suitable word or phrase may be predefined and stored in a list that is accessed by the text-based search engine 556 to facilitate a search process.

Optionally, some words or phrases will always be used in the search process. For example, the name of a famous actor may be included in a list of predefined words and/or phrases that will be used in the search process. Any suitable word or phrase may be predefined and stored in a list that is accessed by the text-based search engine 556 to facilitate a search process.

In some instances, a received member dialogue video or producer dialogue video may be related to multiple thematic content events. Additionally, or alternatively, different portions of a received member dialogue video or producer dialogue video may be related to different thematic content events. The text-based search engine 556 is configured to associate the analyzed member dialogue video or producer dialogue video with multiple modified thematic content events, and to associate portions of the analyzed member dialogue video or producer dialogue video with different modified thematic content events.

Information for each received member dialogue video or producer dialogue video and its associated one or more member dialogue videos is saved for later generation of a conversation video for a particular modified thematic content event. In an example embodiment, this information is stored in the identifier database 548 of the community commentary information storage medium 140. In other embodiments, the information may be saved in other suitable media that is accessible by the conversation video generation logic 502.

In some embodiments, the associated one or more thematic content events may be already associated with a received member dialogue video or producer dialogue video. In such situations, the conversation video generation logic 502 does not need to identify the thematic content event with the received member dialogue video or producer dialogue video using the text-based search engine 556. Rather, the received information may be directly stored into the identifier database 548.

For example, but not limited to, the user 104 or the producer may use a suitable interface to type in or otherwise specify the words of the title of the particular thematic content event that they are discussing. The words of the title are then automatically included in the member dialogue video or producer dialogue video that is communicated to the video community system 100.

As another example, the user 104 may be watching a particular thematic content event while they are generating a member dialogue video. If the device 112, 402 that is generating the member dialogue video is also presenting the particular thematic content event, or is in communication with another device that is presenting the particular thematic content event, then the identity of that thematic content event is determinable. For example, the title of the thematic content event may be available for the EPG information 442 since the device 112, 402 can identify the presented thematic content event. A program identifier (PID) or other suitable identifier may be available from the EPG information 442 and/or may be available in the metadata of the presented thematic content event. The determined identifier may then be automatically included in the member dialogue video that is communicated to the video community system 100.

As another non-limiting example, the remote control 450 (FIG. 4) provisioned with a camera/microphone 436 may be the device that is used to generate the member dialogue video. Since the user 104 has previously operated the remote control 450 to select the particular thematic content event that the user 104 is discussing, the identity of that particular thematic content event is determinable by the remote control 450 and/or the controlled media device 112.

In some situations, the media device 112 may be presenting the particular thematic content event while the user is using their mobile device 402 to generate the member dialogue video. Here, the mobile device 402 may establish a suitable communication link to the media device 112 and query the media device 112 for the title and/or other suitable identifier of the currently presented thematic content event. The media device 112 may then determine the identifier of the currently presented thematic content event based on the EPG information 442 and/or information in the metadata of the thematic content event. This identifying information can then be communicated from the media device 112 to the mobile device 402 for automatic inclusion in the generated member dialogue video.

If a producer or other knowledgeable person is using the thematic content modify system 122 (FIG. 2) to generate their producer dialogue video, the title of the thematic content event or other suitable identifier may then be automatically included in producer dialogue video that is communicated to the video community system 100. For example, the producer may type in or otherwise specify the title of the thematic content event via the operator interface 202. Alternatively, or additionally, a program identifier (PID) or other suitable identifier may be used to automatically identify the thematic content event.

Association of Rant and Endorsement Videos with Community Members

When a community member wishes to become a recognized expert (being particularly knowledgeable about a particular thematic content event and/or a particular genre and/or topic pertaining to the thematic content event), the community member generates a rant video the provides persuasive arguments, and preferably supporting facts, for their assertion that they should become a recognized expert. The identity of the community member must be determinable for each received rant video.

In an example embodiment, the community member generating the rant video may speak their name in an introductory statement or the like. The ATTE 554 may then be used by the video community system 100 to determine the identity of the community member submitting the rant video.

Alternatively, or additionally, the community member may type in their name using a suitable user interface during generation of the rant video. For example, the community member may use the plurality of the controllers 452 on the remote control 450 to enter their name when using their remote control to generate the rant video. The community member may enter their name when using their mobile device 402 to generate the rant video. Alternatively, or additionally, the community member may enter their name via the user interface 438 when generating their rant video using the media device 112.

In some embodiments, the identity of the community member may be inferred based on the device that is used to generate the rant video. For example, the media device 112, the mobile device 402 and/or the remote control 450 may have a unique identifier, such as a serial number or the like. Alternatively, or additionally, account information may be associated with the media device 112, the mobile device 402 and/or the remote control 450 generating the rant video, wherein the account information is associated with the submitting community member. For example, if the mobile device 402 is cellular phone or the like, the telephone number, subscriber identity module (SIM) card identifier, Global System for Mobile (GSM) Communications identifier, or the like may be used to determine the identity of the submitting community member.

Once the identity of the community member submitting a rant video is determined, the identifying information is associated with the rant video. This information is saved into the identifier database 548 so that the submitting community member can be identified when a proof video is generated by the video community system 100.

When a proof video is generated, endorsement videos, or portions thereof, may be included to further bolster the submitting community member's assertion that they should become a recognized expert. For example, a famous actor, producer, director or other notoriously well known person may generate an endorsement video in support of a particular community member. When an endorsement video is received by the video community system 100, the identity of the individual generating the endorsement video and the intended beneficiary community member must be determinable.

In an example embodiment, the individual generating the endorsement video may speak their name and/or the name of the intended beneficiary community member in an introductory statement or the like. The ATTE 554 may then be used by the video community system 100 to determine the identity of the individual submitting the endorsement video and the intended beneficiary community member.

Alternatively, or additionally, the individual may type in their name and/or the name of the intended beneficiary community member using a suitable user interface during generation of the endorsement video. For example, the individual may use the plurality of the controllers 452 on the remote control 450 to enter their name and/or the name of the intended beneficiary community member when using their remote control to generate the endorsement video. The individual may enter their name and/or the name of the intended beneficiary community member when using their mobile device 402 to generate the endorsement video. Alternatively, or additionally, the individual may enter their name and/or the name of the intended beneficiary community member via the user interface 438 when generating their rant video using the media device 112.

In some embodiments, the identity of the individual generating the endorsement video may be inferred based on the device that is used to generate the endorsement video. For example, the media device 112, the mobile device 402 and/or the remote control 450 may have a unique identifier, such as a serial number or the like. Alternatively, or additionally, account information may be associated with the media device 112, the mobile device 402 and/or the remote control 450 generating the endorsement video, wherein the account information is associated with the submitting individual. For example, if the mobile device 402 is cellular phone or the like, the telephone number, subscriber identity module (SIM) card identifier, Global System for Mobile (GSM) Communications identifier, or the like may be used to determine the identity of the individual submitting the endorsement video.

Once the identity of the individual submitting a endorsement video and the intended beneficiary community member is determined, the identifying information is associated with the endorsement video and the rant video of the intended beneficiary community member. The information is saved into the identifier database 548 so that the submitting individual and the intended beneficiary community member can be identified when a proof video is generated by the video community system 100.

J. Conversation Video Generation

Embodiments of the video community system 100 are configured to receive member dialogue videos (video and/or audio commentary) from the user 104, receive member dialogue videos from a plurality of other users, and/or receive producer dialogue videos from other individuals that are knowledgeable about the thematic content event. Based on the received video and/or audio commentary, embodiments of the video community system 100 then generate a conversation video that incorporates selected ones of the received member dialogue videos and/or producer dialogue videos (or portions thereof). The conversation video may optionally include selected portions of that particular thematic content event. The generated conversation video emulates a conversation about the thematic content event between the user 104 and other users and/or knowledgeable individuals. Thus, upon viewing the conversation video, the user 104 has an experience that is comparable to the above-described group of friends who are together to discuss the thematic content event.

A conversation video may be generated that presents a conversation spanning the entirety of a particular thematic content event. In such a conversation video, all of the scenes, or selected scenes of significance to the story line of the thematic content event, may be discussed in a chronological order that corresponds to the order of scene presentation in the thematic content event. Alternatively, or additionally, a plurality of selected scenes that are related to each other may be discussed as a group in the conversation video. Accordingly, the user 104 upon viewing the conversation video, is experiencing an emulated conversation among community members and other knowledgeable persons about the entirety of the thematic content event.

Other conversation videos may discuss particular topics and/or particular subject matter of a thematic content event. For example, one or more scenes may be so significantly interesting, and may be of such significant community interest, that the conversation video may be focused on that particular aspect of the thematic content event. For example, the thematic content event may have a story line relating to social issues that are of great interest to society. Accordingly, discussion relating to other scenes that are not particularly relevant to the social interest topic are omitted from the thematic content event. In such a conversation video, selected scenes relating to the particular topic or subject matter of interest may be discussed in the conversation video. The related scenes may be discussed in a chronological order corresponding to the order of scene presentation in the thematic content event. Alternatively, or additionally, a plurality of selected scenes that are further related to each other may be discussed as a group in the conversation video. Accordingly, the user 104 upon viewing the conversation video, is experiencing an emulated conversation among community members and other knowledgeable persons who are interested in the topic or subject matter of interest.

Alternatively, or additionally, one or more selected scenes may be discussed in a generated conversation video. For example, a single scene, or a few selected scenes, may themselves we worthy of their own conversation video. For example, the thematic content event may employ a new cinematic special effect that has never before been used in the filming of thematic content events. Accordingly, the user 104 upon viewing the conversation video, experiences an emulated conversation among community members and other knowledgeable persons about the cinematic special effect of interest In some situations, multiple thematic content events, or portions thereof, may be discussed in a generated conversation video. In such a conversation video, selected scenes from the multiple modified thematic content events may be discussed. For example, a series of related thematic content events may be discussed in a thematic content event on an episode-by-episode basis. Alternatively, the conversation video may present a discussion about a particular actor of the series, and/or may present a discussion about recurring topic in the plurality of thematic content events. Accordingly, the user 104 upon viewing the conversation video, experiences an emulated conversation among community members and other knowledgeable persons about a group of related thematic content events.

Generation of a conversation video begins when the general structure and architecture of a generated conversation video is initially defined, preferably by an operator of the video community system 100. For example, the operator may specify that the conversation video is to present a general discussion about the entirety of a particular thematic content event. Alternatively, or additionally, the operator may structure the conversation video to present a discussion about one or more special topics and/or about selected specific subject matter presented in a particular thematic content event and/or multiple thematic content events.

Once the general structure and architecture of the conversation video to be generated has been defined (which includes a specification of the particular thematic content events that are to be used for generation of the conversation video), the video community system 100 retrieves the specified modified thematic content event(s) from the modified thematic content event storage medium 124. The retrieved modified thematic content event is then saved as the working thematic content event 508 that is to be processed by the conversation video generation logic 502. For example, if the first thematic content event 516 is specified as the thematic content event that is to form the basis of the generated conversation video, the stored video/audio data of the thematic content event 1 (reference numeral 518) is accessed, and then is stored into the video/audio data of the thematic content event 510 for later processing by the conversation video generator 132. The stored anchor points 1 (see reference numeral 520) and the stored keywords 1 (see reference numeral 522) of this first thematic content event are also accessed, and then are stored as the working anchor points 512 and the working keywords 514, respectively.

The identifier database 548 is also accessed to identify member dialogue videos and/or producer dialogue videos that are associated with the specified thematic content event. Identified member dialogue videos and/or producer dialogue videos (or discussion portions thereof) are then each analyzed by the ATTE 554 to determine the text of the dialogue. The determined dialogue text of each analyzed member dialogue video and/or producer dialogue video is then compared with the keywords of the specified modified thematic content event by the text-based search engine 556.

The text-based search engine 556 matches determined textual dialogue with one or more keywords associated with a particular one of the anchor points. Then, the corresponding anchor point of that matched keyword is identified. Based on the anchor point location information of the identified anchor point, the pertinent location in the modified thematic content event that the determined textual dialogue pertains to is identified. Then, that particular analyzed member dialogue video and/or producer dialogue video is associated with the identified location in the modified thematic content event.

As more member dialogue videos and/or producer dialogue videos associated with the specified thematic content event are analyzed, additional member dialogue videos and/or producer dialogue videos each become associated with a particular location in the thematic content event. In some instances, many member dialogue videos and/or producer dialogue videos are associated with same location in the thematic content event (identified by the location information in the associated anchor points).

Some member dialogue videos and/or producer dialogue videos may provide commentary about different portions of the specified thematic content event. The conversation video generation logic 502 is configured to identify and parse out the different discussion portions of an analyzed member dialogue video or analyzed producer dialogue video. Then, for each parsed out individual discussion, the conversation video generation logic 502 identifies the particular relevant location in the thematic content event for each of the parsed out discussion portions.

Typically, a member dialogue video and/or a producer dialogue video may transition from one discussion to another discussion throughout the course of the dialogue video or producer dialogue video. In an example embodiment, the conversation video generation logic 502 parses out individual discussions (determined discussion portions of the member dialogue video) based on a textual analysis of the determined dialogue text. For example, but not limited to, transitional words such as "next" or the like may be used to identify a transition from one discussion portion to another discussion portion.

Alternatively, or additionally, the words of the determined text may indicate a transition. For example, the user 104 may be discussing a first actor's performance in a particular scene, and then proceed to a discussion of a second actor's performance in another scene. The names of the first and second actors may be identified, and therefore be determined to be different from each other. The change in actor names during the commentary of the member dialogue video may be used to identify a transition from one discussion portion to another discussion portion.

As yet another non-limiting example, the user 104 may be discussing a topic or characteristic of a particular scene, and then proceed to a discussion of a different topic or characteristic in a different scene or even in the same scene. In an example embodiment, the topics and/or characteristics may be differentiated from each other by the text-based search engine 556. For instance, the user 104 may be discussing a first scene filmed at night (and thus the user 104 may using words such as night, dark, stars, moon, etc.) and then transition to a discussion about a second scene filmed during the day (and thus user 104 may then be using words such as light, sun, shade, shadows, or the like.) The change in the description of topics or characteristics during the commentary of the member dialogue video may indicate a transition from one discussion portion to another discussion portion. For instance, a transition may be identified when the determined text has the words "stars" therein, and then changes to then include the word "sun" or the like. These particular example words spoken in a member dialogue video would tend to indicate a transition between discussion portions of the member dialogue video.

Next, the text-based search engine 556 compares the text of each individual discussion portion with the keywords of the modified thematic content event. When the text of an individual discussion portion matches keywords associated with a particular anchor point, then the location information of that anchor point may be used to identify the corresponding location in the thematic content event that that particular discussion portion pertains to.

In some embodiments, a member dialogue video may be generated while the user 104 is viewing presentation of a modified thematic content event which already has associated anchor points throughout the modified thematic content event. If the device 112, 402 that is generating the member dialogue video is synchronized with presentation of the particular modified thematic content event, or is in communication with another device that is presenting the particular modified thematic content event, then anchor points may be encountered from time to time while the user 104 is providing their commentary during generation of their member dialogue video. In such situation, an annotation or the like may be added into the member dialogue video to indicate the identity of an encountered anchor point, thereby associating the anchor point with a particular location in the member dialogue video. For example, the user 104 may be discussing scene "A" during a particular point in the generation of their member dialogue video. If an anchor point associated with scene "A" is encountered, then the identification of that particular anchor point can be saved with that particular portion of the member dialogue video. When that portion of the member dialogue video is later analyzed, the identified anchor point may be used to more quickly and efficiently identify where in the thematic content event that particular member dialogue video portion should be associated with.

As the member dialogue videos and/or producer dialogue videos associated with the specified thematic content event are processed, a plurality of member dialogue videos and/or producer dialogue videos (or discussion portions thereof) becomes uniquely associated with locations (as identified by the anchor points) in the thematic content event.

Next, the conversation video generation logic 502 constructs the conversation video by selectively picking and choosing those associated member dialogue videos and/or producer dialogue videos (or discussion portions thereof) for each particular scene and/or topic that is to be discussed during the conversation video. For example, the thematic content event may have ten significant scenes, and/or ten significant topics presented by one or more different scenes, that are to be discussed in a generated conversation video. These ten significant scenes and/or topics are specified by the operator of the video community system 100 in an example embodiment. Further, the discussion order of the scenes and topics may be specified by the operator, or alternatively, may be ordered based on their relative order of presentation in the thematic content event.

For the first scene or topic to be discussed in the conversation video, there may be many, or even thousands of, member dialogue videos and/or producer dialogue videos (or discussion portions thereof) that have been identified as potential candidates pertaining to that first scene or topic (based on the association of the determined text and keywords, and the location information from the anchor points associated with the keywords). From the pool of available candidate member dialogue videos and/or producer dialogue videos (or discussion portions thereof), the conversation video generation logic 502 chooses a limited number of the member dialogue videos and/or producer dialogue videos (or discussion portions thereof) for inclusion into a generated conversation video. This selection of a limited number of member dialogue videos and/or producer dialogue videos (or discussion portions thereof) is desirable so that the portion of the generated conversation video does not become too long.

In an example embodiment, the number of selected member dialogue videos and/or producer dialogue videos (or discussion portions thereof) may be predefined. Alternatively, or additionally, a duration for a portion of the conversation video may be predefined. Thus the duration of selected candidate member dialogue videos and/or producer dialogue videos (or discussion portions thereof) may be added together so that the total duration of the conversation video does not exceed the predefined duration.

In some situations, the number and/or duration of the selected member dialogue videos and/or producer dialogue videos (or discussion portions thereof) for one particular scene or topic may be different from other scenes and/or topics presented in the conversation video. The desired number and/or duration for discussion of each scene and/or topic may be specified by the operator of the video community system 100. For example, a first scene may be specified to have no more than three member dialogue videos and/or producer dialogue videos (or discussion portions thereof). A more important second scene or topic may be specified to have between six and eight member dialogue videos and/or producer dialogue videos (or discussion portions thereof). Thus, final selection of candidate member dialogue videos and/or producer dialogue videos (or discussion portions thereof) may be based on a predefined number.

Alternatively, or additionally, a total duration of discussion may be defined for each of the scenes and/or topics. For example, a duration of the discussion for the first scene or topic may be specified to be three minutes, and the total duration for the more important second scene or topic may be specified to be between six to eight minutes. Thus, final selection of candidate member dialogue videos and/or producer dialogue videos (or discussion portions thereof) may be based on the specified duration.

In some embodiments, the number and duration are considered together. Thus, a particularly long duration member dialogue video and/or producer dialogue video (or discussion portions thereof) might be initially selected for inclusion into the conversation video, but may later be discarded or otherwise disqualified if the total duration of discussion allocated for that particular scene or topic is exceeded. An alternative candidate member dialogue videos and/or producer dialogue videos (or discussion portions thereof) may then be selected.

Alternatively, or additionally, weighting factors may be assigned to each scene and/or topic. Then, based on a total specified duration for the conversation video, the number and/or duration may be automatically adjusted (determined) for each scene and/or topic. For example, a more important scene or topic may have a weighting of two times that of another scene or topic. Thus, if the other scene or topic is determined to have at most three member dialogue videos and/or producer dialogue videos (or discussion portions thereof), then the more important scene or topic would have six member dialogue videos and/or producer dialogue videos (or discussion portions thereof). Similarly, if the other scene or topic is determined to have at most a total duration of three minutes of member dialogue videos and/or producer dialogue videos (or discussion portions thereof), then the more important scene or topic would have a duration of six minutes of member dialogue videos and/or producer dialogue videos (or discussion portions thereof).

Once candidate member dialogue videos and/or producer dialogue videos (or discussion portions thereof) have been identified for a particular scene and/or topic of the thematic content event, and a determination has been made for the total number of and/or total duration of the member dialogue videos and/or producer dialogue videos (or discussion portions thereof) that may be used for each scene and/or topic, the conversation video generator 132 next picks and chooses particular member dialogue videos and/or producer dialogue videos (or discussion portions thereof) for inclusion in the conversation video.

When the number of candidate member dialogue videos and/or producer dialogue videos (or discussion portions thereof) exceeds the allocated total number and/or total duration for a particular scene or topic, embodiments of the conversation video generator 132 must select which of the candidate member dialogue videos and/or producer dialogue videos (or discussion portions thereof) are to be used for generation of the conversation video and which of the candidate member dialogue videos and/or producer dialogue videos (or discussion portions thereof) are not to be used. Preferably, more interesting, more informative, and/or more entertaining candidate member dialogue videos and/or producer dialogue videos (or discussion portions thereof) are selected over less interesting, less informative, and/or less entertaining candidates.

In an example embodiment, the operator of the video community system 100 makes a determination of which candidate member dialogue videos and/or producer dialogue videos (or discussion portions thereof) will be used in the generated conversation video, and which candidates will not be used. The video community system 100 may present a menu or the like to the operator that indicates the identified candidate member dialogue videos and/or producer dialogue videos (or discussion portions thereof) on a scene by scene, or by a topic by topic, basis. The menu is configured to permit the operator's selection of candidate member dialogue videos and/or producer dialogue videos (or discussion portions thereof) for inclusion in the conversation video.

Some menus may be configured to permit the operator to view selected candidate member dialogue videos and/or producer dialogue videos (or discussion portions thereof) so that the operator may subjectively base their selection amongst the candidate member dialogue videos and/or producer dialogue videos (or discussion portions thereof) using their personal preferences. That is, after viewing candidate member dialogue videos and/or producer dialogue videos (or discussion portions thereof), the operator may select their favorites for inclusion in the generated conversation video.

Alternatively, or additionally, the member dialogue videos and/or producer dialogue videos (or discussion portions thereof) may be automatically selected from the candidate pool of member dialogue videos and/or producer dialogue videos (or discussion portions thereof). In an example embodiment, a rating system or priority system may be used for selection among candidate member dialogue videos and/or producer dialogue videos (or discussion portions thereof). For example, but not limited to, a member dialogue video provided by a recognized community member may have a higher rating or priority than a member dialogue video provided by other community members. As another example, a producer dialogue video (or discussion portions thereof) provided by a notoriously famous and well-liked actor may have a higher rating or priority than a producer dialogue video provided by an unknown actor. Any suitable rating system or priority system may be used by the various embodiments.

For example, but not limited to, a member dialogue video from a recognized expert community member may have a rating or priority of 9 (out of 10), and member dialogue video submitted by a relatively unknown or new community member may have a lower rating or priority of 2 (out of 10). Thus, if only one of these two candidate member dialogue videos can be selected for the conversation video, the higher rated candidate member dialogue video may be automatically selected. Presenting higher rated member dialogue videos in a conversation video is appreciated to result in a more interesting and/or entertaining conversation video Further, other criteria may be used to select member dialogue videos and/or producer dialogue videos (or discussion portions thereof). For example, opposing viewpoints may be made by different groups of candidate member dialogue videos and/or producer dialogue videos (or discussion portions thereof). For example, one group of candidates may express a like for a particular scene, and another group of candidates may express a dislike for the same scene. Accordingly, one or more from the group expressing a liking for the scene, and one or more from the group expressing a dislike for the scene may be selected for inclusion in the conversation video. All similar views may be presented together as a group in an example embodiments. Alternatively, or additionally, opposing viewpoints may be interleaved to create dialogue exchange that emulates an argument. Presenting opposing viewpoints in a conversation video is appreciated to result in a more interesting and/or entertaining conversation video.

Alternatively, or additionally, an example criteria may require that a selected member dialogue video and/or producer dialogue video (or discussion portion thereof) have supporting reasoning and/or supporting facts. In such embodiments, the presence or absence of supporting reasoning and/or supporting facts may be used to select among candidates. For example, a first community member may state in their member dialogue video that they like a particular scene because of certain specific reasons which have been articulated in support of their opinion. Further, the first community member may optionally provide supporting facts in their conversation video in support of their opinion. In contrast, a second community member may merely say that they like the same scene in their conversation video, with no discussion of their reasoning or with no supporting facts. Accordingly, the member dialogue video provided by the first community member may be more desirable (and thus is selected for inclusion in the conversation video) than the member dialogue video from the second community member (which is not selected).

In some instances, a first community member may provide a relatively comprehensive first member dialogue video that discusses most of, or all of, the scenes and/or topics of the thematic content event. In contrast, a second community member may submit a relatively short and/or less comprehensive second member dialogue video that discusses a single scene or topic, or that discusses a limited number of scenes and/or topics. The more comprehensive first member dialogue video from the first community member may be parsed into a plurality of discussion segments, each pertaining to discussion for the different scenes and/or topics, and then incorporated into the generated conversation video. The less comprehensive second member dialogue video from the second community member may be omitted since there would be fewer and/or shorter discussion segments As another example, the user 104 may be watching a particular thematic content event while they are generating a member dialogue video. If the device 112, 402 that is generating the member dialogue video is also presenting the particular thematic content event, or is in communication with another device that is presenting the particular thematic content event, then the identity of that thematic content event is determinable. For example, the title of the thematic content event may be available for the EPG information 442 since the device 112, 402 can identify the presented thematic content event. A program identifier (PID) or other suitable identifier may be available from the EPG information 442 and/or may be available in the metadata of the presented thematic content event. The determined identifier may then be automatically included in the member dialogue video that is communicated to the video community system 100 parsed out from that second member dialogue video. Here, since many discussion segments from the selected first member dialogue video provided by the first community member is used throughout the conversation video, the overall discussion presented by the conversation video will seem more intimate and personal to the viewing user 104. That is, a conversation video presenting discussion segments from a relatively few number of community members and/or other knowledgeable persons will more closely emulates a small intimate discussion group having a conversation about the thematic content event. In such situations, the user 104 is more likely able to develop personal connections with the relatively small number of community members and/or other knowledgeable persons presenting their comments in the conversation video. In contrast, a conversation video presenting discussion segments from a relatively large number of different community members and/or other knowledgeable persons may be more difficult to follow by the viewing user 104 because such a conversation video emulates a large discussion group. Here, the user 104 is less likely able to develop personal connections with such a large number of community members and/or other knowledgeable persons.

Some embodiments of the video community system 100 employ a hierarchical tree structure to identify and select member dialogue videos and/or producer dialogue videos (or discussion portions thereof) from a large number of available member dialogue videos and/or producer dialogue videos (or discussion portions thereof). That is, a hierarchical tree structure is used to progressively narrow the pool of candidates so that more desirable candidates are retained for consideration, and less desirable candidates are eliminated from further consideration.

For example, an embodiment that employs the hierarchical tree structure process may first identify those member dialogue videos and/or producer dialogue videos (or discussion portions thereof) that are associated with the specified thematic content event. Other member dialogue videos and/or producer dialogue videos (or discussion portions thereof) that have not been associated with the specified thematic content event are no longer considered as candidates.

Then, the hierarchical tree structure process may identify member dialogue videos and/or producer dialogue videos (or discussion portions thereof) provided by recognized community experts and/or by other well known, notorious and knowledgeable persons. Here, member dialogue videos from recognized community experts can be anticipated to be more interesting, more informative, and/or more entertaining that member dialogue videos from other community members. Similarly, a producer dialogue video from a famous actor can be anticipated to be more interesting than a producer dialogue video from an unknown actor. Such candidate member dialogue videos and/or producer dialogue videos (or discussion portions thereof) are retained for further consideration. In contrast, candidates from community members who are not recognized experts, and/or from others who are not well known, may be eliminated as candidates for further consideration.

As the number of candidate member dialogue videos and/or producer dialogue videos (or discussion portions thereof) is reduced through each successive iteration performed during the hierarchical tree structure process, more interesting, more informative, and/or more entertaining member dialogue videos and/or producer dialogue videos (or discussion portions thereof) remain as candidates. One or more other tree structure criteria may then be applied to further reduce the number of candidates for consideration. At some point in the hierarchical tree structure process, a manageable number of candidate member dialogue videos and/or producer dialogue videos (or discussion portions thereof) will remain for consideration.

The final selection of candidate member dialogue videos and/or producer dialogue videos (or discussion portions thereof) may be made by the operator of the video community system 100 based on their persona subjective preferences. Or, the final candidates may be identified automatically, such as when the total number of and/or total duration of candidates allocated for the identified scenes and/or topics falls within specified allocations (such as the total number and/or total duration specified for a conversation video).

When a particular scene or topic has multiple member dialogue videos and/or producer dialogue videos (or discussion portions thereof) that have been selected for inclusion in a generated conversation video, the order of presentation of the selected member dialogue videos and/or producer dialogue videos (or discussion portions thereof) may be determined. The final order may be made by the operator of the video community system 100 based on their personal subjective preferences. Or, the final order may be determined automatically, such as when those member dialogue videos and/or producer dialogue videos (or discussion portions thereof) expressing a like for the scene or topic are to be presented before those selected candidates expressing a dislike for the scene or topic.

Some embodiments of the video community system 100 are configured to select portions of the video and/or audio thematic content event for inclusion in a conversation video. For example, when a particular scene is being discussed in a conversation video, the video portion of that scene or a portion thereof, may be included in the generated conversation video. The audio portion of the thematic content event may be omitted or otherwise muted so that the user 104 can listen to the dialogue of the currently presented member dialogue videos and/or producer dialogue videos (or discussion portions thereof). With presentation of selected portions of the thematic content event, the user 104 viewing the conversation video at a later time more readily appreciates the nature of the conversation presented by the conversation video since they may review that scene (or portion thereof) while listening to the audio commentary from community members and/or other knowledgeable persons.

The presentation of video content and audio content in a conversation video may be formatted in a variety of manners. For example, the video portion of the conversation video may present the image of the contributing community member while the audio portion presents their commentary dialogue. Alternatively, or additionally, the video portion of the conversation video may present a particular scene (or portion thereof) while the audio portion presents commentary dialogue of one or more contributing community members. Alternatively, or additionally, an image of the contributing community member may be concurrently presented with the scene (or portion thereof) using a picture over picture format, a picture in picture format, a split screen format, a full screen format, or the like, wherein the presented scene (or portion thereof) is relatively smaller than the view field of the display that presents the image of the contributing community member. Alternatively, images of the current speaker or the like may be relatively smaller than the view field of the display that is presenting the scene.

In an example embodiment, once a draft conversation video has been generated, the draft conversation video may be optionally presented to the operator for review, editing and/or approval. The operator may modify the draft conversation video by adding and/or deleting selected member dialogue videos and/or producer dialogue videos (or discussion portions thereof). Alternatively, or additionally, the operator may choose to add or delete scenes (or portions thereof) from the thematic content event.

Once a particular conversation video has been generated, the conversation video is communicated from the conversation video output interface 506 for storage in the conversation video storage medium 134. For example, if the first thematic content event is selected for generation of a conversation video, the corresponding first modified thematic content event 516 (see MTCE 1 illustrated in FIG. 5) is accessed by the conversation video generator 132. The conversation video that is generated based on the first modified thematic content event is then stored as conversation video 1 (see reference numeral 550). The information for this first stored conversation video further includes at least one identifier that uniquely associated this first conversation video with the first thematic content event.

Later, when the user 104 wishes to access a conversation video associated with a particular thematic content event of interest, a request is generated by the device 112, 402. The request is communicated to the member interface 138. Based on the identity of the thematic content event of interest indicated in the request, the video community system 100 accesses the particular conversation video(s) associated with the identified thematic content event. The accessed conversation video(s) is then communicated back to one or both of the devices 112, 402. The received conversation video(s) may then be presented to the user 104.

In an example embodiment, the user 104 may have to specify the title or other identifier of the thematic content event of interest. For example the user may type in the title of the thematic content event. Alternatively, or additionally, some embodiments may automatically determine the title or identifier of the thematic content event. For example, if the device 112, 402 is currently presenting the thematic content event the title or identifier of the thematic content event may be determined based on the EPG information 442 and/or the metadata information of the currently presented thematic content event.

In some situations, multiple associated conversation videos may be available for a single thematic content event. In an example embodiment, all associated conversation videos are communicated to one or both of the devices 112, 402. A selectable menu or the like (such as an EPG) may be presented to the user 104 that provided descriptive information of each different one of the available conversation videos. The user can then select one or more of the conversation videos for presentation.

In another embodiment, information identifying the plurality of available conversation videos is communicated to one or both of the devices 112, 402. A selectable menu or the like is presented to the user with descriptive information describing characteristics of the different conversation videos. Once the user has selected one or more of the indicated conversation videos of interest, a second communication is returned from one or both of the devices 112, 104 to the video community system 100. The selected one or more conversation videos are then communicated to one or both of the devices 112, 402 for presentation to the user 104.

Alternatively, or additionally, the first request may include supplemental information that describes topics or characteristics of interest that the user 104 is interested in. In this example embodiment, the video community system 100 automatically identifies one or more conversation videos that may be of interest to the requesting user 104 based on the supplemental information in the request. Then, the identified conversation videos may be communicated to one or both of the devices 112, 402. Alternatively, information indicating the identified conversation videos may be communicated to one or both of the devices 112, 402, wherein a second request initiated by the user 104 specifies one or more of the indicated conversation videos that are to be then sent to one or both of the devices 112, 402.

K. Proof Video Generation

Figure 6:
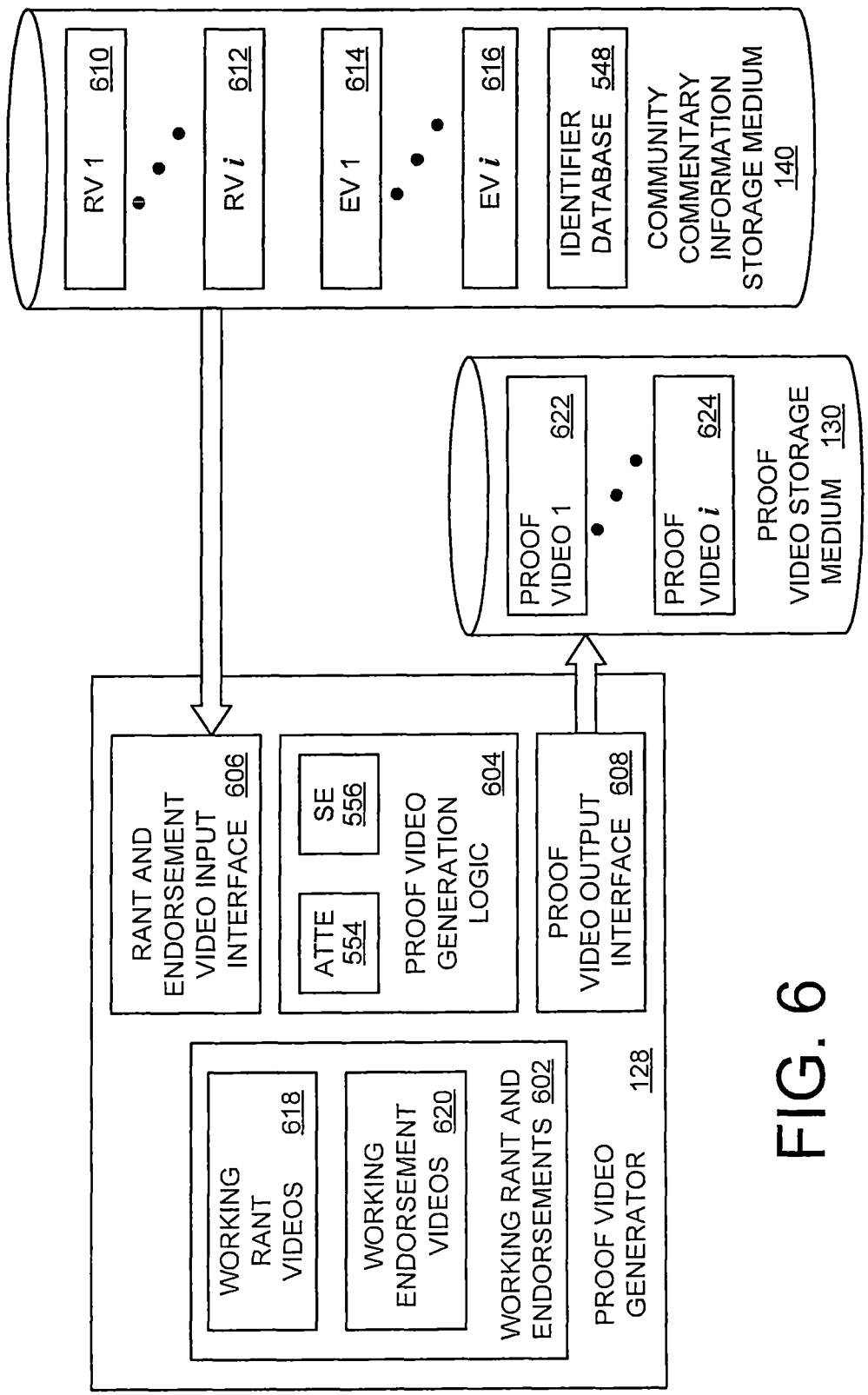
FIG. 6 is a block diagram of the proof video generator, the community commentary information storage medium, and the proof video storage medium.

FIG. 6 is a block diagram of the proof video generator 128, the community commentary information storage medium 140, and the proof video storage medium 130. The proof video generator 128 is configured to generate proof videos based on one or more rant videos received from a community member seeking recognition and/or based on one or more endorsement videos supporting that community member. The proof video generator comprises a working rant and endorsements medium 602, proof video generation logic 604, a rant and endorsement video input interface 606, and a proof video output interface 608

A proof video presents commentary (opinions and views) of a particular community member about a particular thematic content event and/or about a particular genre and/or topic pertaining to the thematic content event. In some instances, the particular community member may have been deemed by the community as being an expert in (based upon affirmation votes and/or denial of affirmation votes previously received from other community members). A suitable icon, text note or the like may be presented in the proof video to indicate that the community member is a recognized expert community member.

The community commentary information storage medium 140 stores a plurality of rant videos, illustrated as the first rant video 610 (illustrated as "RV 1") through a last rant video 612 (illustrated as "RV i"), and a plurality of endorsement videos, illustrated as the first endorsement video 614

(illustrated as "EV 1") through a last endorsement video 616 (illustrated as "EV i"). The community commentary information storage medium 140 further includes, in the identifier database 548 or in another suitable medium, stored identifiers that uniquely identify each one of the stored rant videos and endorsement video. The unique rant video identifier further includes information identifying the community member that the rant video is generated for. Also, the unique endorsement video identifier includes information that identifies the person who generated the endorsement video and the identity of the intended beneficiary community member that the endorsement video is supporting. In alternative embodiments, one or more of the rant videos, endorsement videos, and/or the information in the identifier database 548 may be stored in a distributed fashion using other memory mediums.

In practice, a community member generates a rant video using one of the devices 112, 402. The generated rant video is communicated to the member interface 138. The video community system 100 stores the received rant video into the community commentary information storage medium 140. The rant video further includes information identifying the community member who generated the rant video. The identifying information may be the name of the community member. Alternatively, other identifying information may be used, such as a handle, nickname, or the like, that uniquely identifies the community member who generated the received rant video.

When a single rant video is processed to generate a proof video, the rant video is accessed from the community commentary information storage medium 140. The accessed rant video is then stored into the working rants and endorsements 602 as a working rant video 618.

In some situations, the community member may have generated a plurality of different rant videos that are stored in the community commentary information storage medium 140. Some of the multiple rant videos may be indented to further bolster the community member's arguments that they should become a recognized expert in a particular thematic content event and/or about a particular genre and/or topic pertaining to the thematic content event. Alternatively, the multiple rant videos may be directed to different particular thematic content events and/or about different particular genre and/or topic pertaining to other thematic content events or other topics.

When a single proof video is generated based on a plurality of rant videos, a particular thematic content event and/or a particular genre and/or topic pertaining to the thematic content event is specified. In an example embodiment, the specification is made by the operator of the video community system 100. Alternatively, the ATTE 554 may generate text from the dialogue of the rant video, and the search engine 556 may then identify and specify the particular thematic content event and/or a particular genre and/or topic pertaining to the thematic content event being discussed in the rant video.

Once the particular thematic content event and/or the particular genre and/or topic pertaining to the thematic content event has been specified, a plurality of rant video from that community member having discussions that pertaining to the specification are accessed from the community commentary information storage medium 140 and are saved into the working rant videos 618.

Based on the identity of the community member who generated the received rant video, the search engine 556 searches the plurality of endorsement videos (EV1 through EVi) to find matches with the identified beneficiary community member. If and when a match between the identity of the community member who generated the received rant video and the identified beneficiary community member of an endorsement video is found, the associated endorsement video is accessed and is then stored into the working endorsement videos 620.

At this juncture in the process of generating a proof video for a particular community member, one or more rant videos pertaining to a specified thematic content event and/or a specified genre and/or topic pertaining to the thematic content event have been accessed and stored. Also, any identified endorsement videos for that community member have been accessed and stored.

Then, the proof video generation logic 604 begins the process of generating the proof video from the stored rant videos and the stored endorsement videos. The process of generating a proof video, in some instances, may be a relatively simple process. For example, the proof video may be generated using a single rant video and no endorsement videos. Here, the rant video is incorporated into the proof video with little or no processing of the single rant video. The proof video generation logic 604 may only need to add identifying information of the community member who generated the received rant video, and/or may need to format the proof video for a variety of presentation devices 112, 402 that might be used to view the generated proof video.

In another example situation, a single rant video and one or more endorsement videos may be used to generate a proof video. Accordingly, when a single rant video is processed to generate a proof video, the rant video is accessed from the community commentary information storage medium 140. The accessed rant video is then stored into the working rants and endorsements 602 as a working rant video 618 must determine how to combine the one or more endorsement videos with the single rant video to produce a cohesive presentation of the arguments that the community member should become a recognized expert in a particular thematic content event and/or a particular genre and/or topic pertaining to the thematic content event.

The audio portion of the accessed rant video is converted into text by the ATTE 554. Then, similar to the parsing of member dialogue videos, the rant video is parsed into portions by the search engine 556. Each parsed portion of the rant video preferably presents a single argument on behalf of the community member. That is, each parsed rant video portion preferably includes a single hypothesis statement and includes supporting reasoning and/or supporting facts relating to the hypothesis statement. An example hypothesis statement and supporting reasoning and/or supporting facts may be: "I, Davey Jones, should be a recognized expert in the thematic content event ABC because this is my favorite thematic content event of all time, because I have seen this particular thematic content event multiple times, and because I have authored five articles about this particular thematic content event."

The one or more endorsement videos are similarly analyzed, and parsed out into different endorsement video portion if the individual generating the endorsement video is presenting multiple different arguments in support of the beneficiary community member. For example, famous actor Tom Smith might state: "I have read and agree with the five articles written by Davey Jones, and they are the best I have ever seen for this particular thematic content event ABC." In an example embodiment, each endorsement video (or a portion thereof) is associated with one of the presented arguments (the hypothesis statement and the supporting reasoning and/or supporting facts).

Then, the search engine 556 analyzes the one or more endorsement videos (or portions thereof) to determine where each of the endorsement videos (or portions thereof) should be added into the processed rant video. In an example embodiment, the associated endorsement video (or portion thereof) is placed into the proof video immediately after the conclusion of the presentation of the associated argument made by the community member who generated the rant video. However, the search engine 556 may combine the portions of the rant video and the endorsement videos (or portions thereof) in any suitable order that results in a pleasing, entertaining and convincing proof video.

In some instances, a plurality of rant videos may be submitted by a community member that relate to the same particular thematic content event and/or a particular genre and/or topic pertaining to the thematic content event. That is, the community member may decide to add additional arguments and/or revise previously presented arguments. In an example embodiment, a newer received rant video simply replaces older received rant videos. Thus, the newer rant video is used to generate a new proof video that replaces the proof video that was previously generated based on the older rant video.

However, in other embodiments, multiple rant videos are processed together, much like a plurality of different member dialogue videos, to generate a single proof video. The ATTE 554 generates text for each of the multiple rant videos. The search engine 556 parses out each of the multiple rant videos into portions. Then, the portions are analyzed so that related portions (portions have the same or similar arguments therein) can be grouped together for presentation in the proof video. Also, the related endorsement videos (or portions thereof) may be grouped with the grouped rant video portions. Then, the proof video is generated by the proof video generator.

In some endorsement videos, the person generating the endorsement video may define a set of criteria, attributes or the like. If a particular community member satisfies all of, selected one, or a predefined portion of the predefined criteria, attributes or the like, that community member automatically qualifies as a beneficiary of the endorsement video. During generation of a proof video, the qualifications and/or characteristics of the member that is submitting the rant video is compares with the predefined criteria, attributes or the like associated with the endorsement video. If that community member automatically qualifies as a beneficiary, then that particular endorsement video may optionally be included in the proof video.

The generated proof videos are communicated out from the proof video output interface 608 for storage into the proof video storage medium 130. Since the community has a large number of community members a plurality of different proof videos will likely have been generated for a plurality of different community members. The plurality of different proof videos is represent by a first proof video 1 (indicated by reference numeral 622) through a last proof video i (indicated by the reference numeral 624).

On occasion, the user 104 may be interested in viewing generated proof videos that have been generated for a community member of interest. For example, the user 104 may have recently viewed a conversation video for a particular thematic content event, wherein portions of the conversation video were based on one or more member dialogue videos from that particular community member that is now of interest to the user 104. In some embodiments, the conversation video may even identify that particular community member as being a recognized expert within the community.

In such situations, the user 104 may wish to view any proof videos, if they exist, for the community member of interest that has provided their commentary that has been incorporated into the conversation video. The user 104, using one or both of their devices 112, 402, specifies the identity of the community member of interest and indicates that they would like access to any proof videos for that community member. The devices 112, 402 communicate a request for the proof videos to the video community system 100. In an example embodiment, the request includes the identity of the community member of interest. The video community system 100 uses the identifier of the community member to search the plurality of proof videos stored in the proof video storage medium 130. If a proof video has been generated for that particular community member identified in the request, then that associated proof video can be communicated to one or both of the devices 112, 402 for presentation to the user 104. If a plurality of proof videos are available, a selection menu or the like may be presented to the user so that the user may select one of the multiple proof videos for presentation. An example embodiments communicates all available proof videos to one or both of the devices 112, 402. Other embodiments first communicate information describing each of the multiple proof vides. After user selection of one (or more) of the multiple proof videos, the a second request is communicated to the video community system 100 that identifies the selected proof video(s), which is then communicated to one or both of the devices 112, 402.

Proof videos also include a mechanism for accepting an affirmation vote or a denial of affirmation vote from the user 104, preferable after the user 104 has completed viewing of the proof video. In an example embodiment, a pop-up window or the like is presented to the user 104 that is configured to receive one of the affirmation vote or the denial of affirmation vote. Alternatively, or additionally, one or more of the controllers 452 of the remote control 450 may be configured to permit the user to specify their vote.

Once the user 104 has made either an affirmation vote or a denial of affirmation vote, the vote is communicated from one or both of the devices 112, 402 to the video community system 100. The received vote is then associated with the particular proof video and/or the particular member who generated the rant video(s) used to make the proof video. The associated vote is then stored. In an example embodiment, the vote and the identity of the user 104 are stored in the identifier database 548 (or in another suitable medium). Such embodiment may limit the user 104 to a single vote. Thus, if a subsequent vote is received from the same user 104 for the previously voted-on proof video, that vote can be rejected, or may be used to replace the previous vote (thus permitting the user 104 to change their vote).

In other embodiments, a counter or the like tracks the number of affirmation votes and the number of denial of affirmation votes. When a vote is received from the user 104, the counter may be indexed to the next number. For example, if the proof video has 1000 affirmation votes and 50 denial of affirmation votes, and if the received vote from the user 104 was an affirmation vote, then the new total of votes would be 1001 affirmation votes and 50 denial of affirmation votes.

In some embodiments, an incentive or the like may be used to incentivize the community members to view and vote on proof videos. For example, each received vote from a particular community member may award that community member a reward point or the like. After a sufficient number of reward points are accumulated by that community member, they may be awarded a gift or may be permitted to choose among a plurality of available gifts. In an example embodiment, a gift might be a free movie viewing certificate so that the community member may select a movie of interest from an on-demand system for their viewing enjoyment. Other example gifts may include billing credits that reduce service fees for that community member.

L. Modification of Conversation Videos

The conversation videos available for viewing by community members may be changed, modified, or re-created from time to time. It is appreciated that commentary within the community is likely to evolve over time as more and more community members view a particular thematic content event and then submit their member dialogue videos. For example, when a particular thematic content event is first released to the public, especially if the release is a preview and/or is an offering by a relatively small and/or unknown independent producer, relatively few community members may have viewed the thematic content event and provided their member dialogue videos expressing their viewpoints about the recently released thematic content event. If the thematic content event is very entertaining and/or controversial, a number of new member dialogue videos may be generated over a particularly short span of time. Thus, a previously generated conversation video may become quickly outdated.

Embodiments of the video community system 100 are configured to periodically update and/or generate new conversation videos as the available pool of candidate member dialogue videos and/or producer dialogue videos increases. An example embodiment is configured to periodically update and/or generate new conversation videos based on a predefined duration. Alternatively, or additionally, embodiments may be configured to update and/or generate new conversation videos after a new number of member dialogue videos and/or producer dialogue videos are received by the video community system 100.

In an example embodiment, an entirely new conversation video is generated upon the most recently available pool of candidate member dialogue videos and/or producer dialogue videos. The newly generated conversation video is stored into the conversation video storage medium 134, and thereby replaces the previously generated conversation video. (However, some embodiments may archive the previously generated conversation videos for administrative purposes, but prevent access to community members.)

Alternatively, or additionally, embodiments may be configured to retrieve a previously generated conversation video and the newly submitted member dialogue videos and/or producer dialogue videos. The newly received member dialogue videos and/or producer dialogue videos are used to replace selected, and presumably less interesting or less current, member dialogue videos and/or producer dialogue videos (or discussion portions thereof) that were used to generate the previous conversation video. Some of the new member dialogue videos and/or producer dialogue videos (or discussion portions thereof) may be added into the newly generated conversation video, thus resulting in a longer duration conversation video.

M. Example Conversation and Proof Videos.

Figure 7:
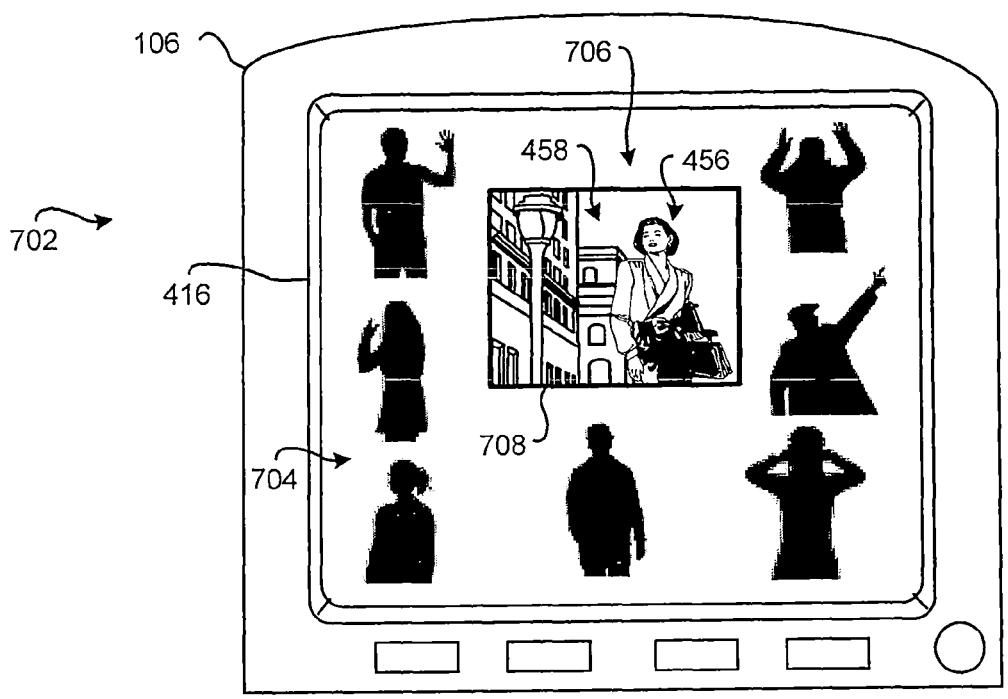
FIG. 7 illustrates a conceptual snapshot of an example conversation video.

FIG. 7 illustrates a conceptual snapshot of an example conversation video 702. The example conversation video 702 includes a plurality of seven community members 704 (or other knowledgeable individuals providing producer dialogue videos) that are providing commentary about the subject member dialogue video, here showing an image of a scene 706 of the subject thematic content event with the actress 456 and the plurality of buildings 458 (see also FIG. 4). It if appreciated that the still images of the community members 704 may be a video of that particular community member 704 providing commentary in the conversation video. Further, at any given moment in the conversation video, one of the community members 704 is providing audio commentary that the viewing user 104 (not shown) is listening to. At times, multiple community members 704 may be providing their audio commentary concurrently. For example, if two or more of the community members 704 are expressing opposing viewpoints, the conversation video may present, as least for some brief durations, overlapping commentary from multiple community members 704 so as to emulate a lively ongoing dispute or argument between the two or more community members 704.

In the example conversation video 702, an image of a selected portion of a scene from the subject thematic content event is illustrated in a viewing pane 708. The illustrated scene portion is presumably part of the scene or portion of the thematic content event that is currently being discussed by the community members 704. In other embodiments, or during other times of this example conversation video 702, the scene 706 may be omitted. Alternatively, the scene 706 may be of a different size, and/or may be shown in another location on the display 416. In some instances, embodiment may present multiple viewing panes with different scenes therein.

In the various embodiments, any suitable number of community members 704 may be concurrently shown on the conversation video 702. Actively speaking community members 704 may be indicated by their movement, which non-talking community members 704 may be still. Alternatively, actively talking community members 704 may be indicated using other indicators, such as a brighter coloring, a pointer, a box, or the like. Alternatively, or additionally, non-talking community members 704 may be represented using a blackened outline or shaded outline of the particular community member 704, and then transition to a photographic video image when they begin to talk. In some embodiments, a small image may be used for currently non-talking community members 704, while speaking community members 704 may transition to an enlarged image while they are talking.

Figure 8:
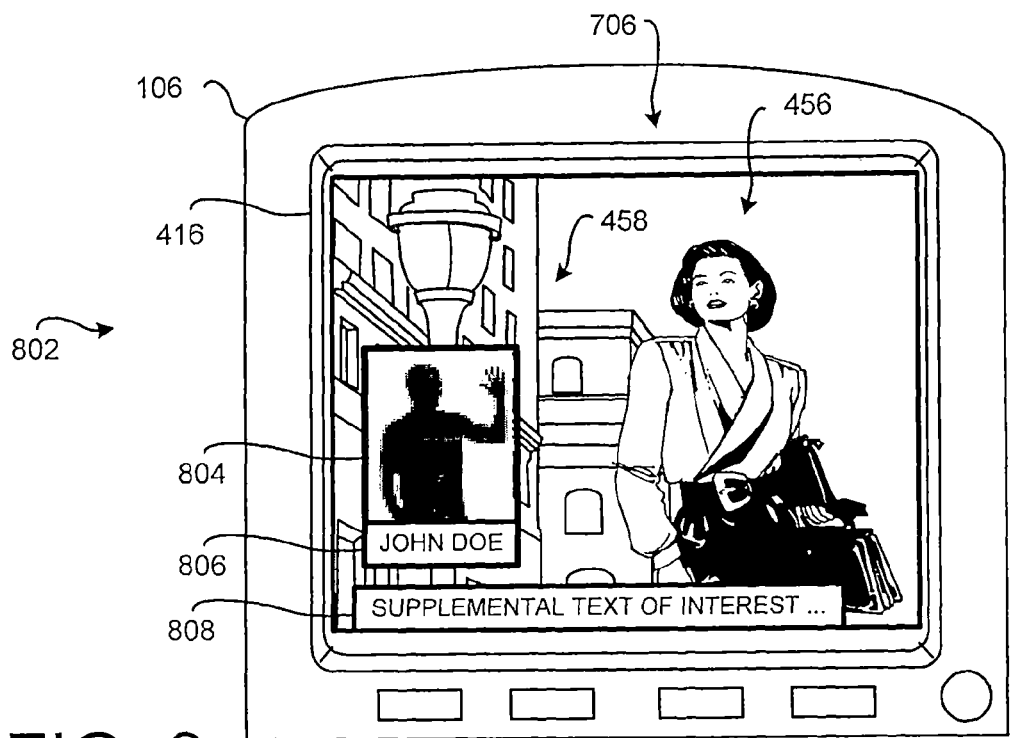
FIG. 8 illustrates a conceptual snapshot of another example conversation video.

FIG. 8 illustrates a conceptual snapshot of another example conversation video 802. Here, a view pane 804 with a video image of a currently speaking community member is shown over the field that is presenting the currently discussed scene 706 of the subject thematic content event. The view pane 804 may be shown at any selected location on the display 416, and may be of any suitable size. Location and/or size of the view pane 804 may be modified as the conversation video progresses. In an example embodiment, when the currently illustrated community member is finished talking, their image may be faded and replaced with a video image of a next speaking community member. Alternatively, or additionally, the next speaking community member may be shown in a new view pane.

In some embodiments, a textual identifier 806 may be shown as part of the view pane 804, or in another suitable location on the display 416, to indicate the identity of the currently speaking community member. Accordingly, the viewing user 104 may better appreciate who is participating in the conversation video, and thereby may develop a more personal connection with the community members 704.

Alternatively, or additionally, a scrolling text banner 808 or the like may be used to indicate supplemental information of interest. The banner 808 may present any text of interest and/or may be located at any suitable place on the display 416.

Figure 9:
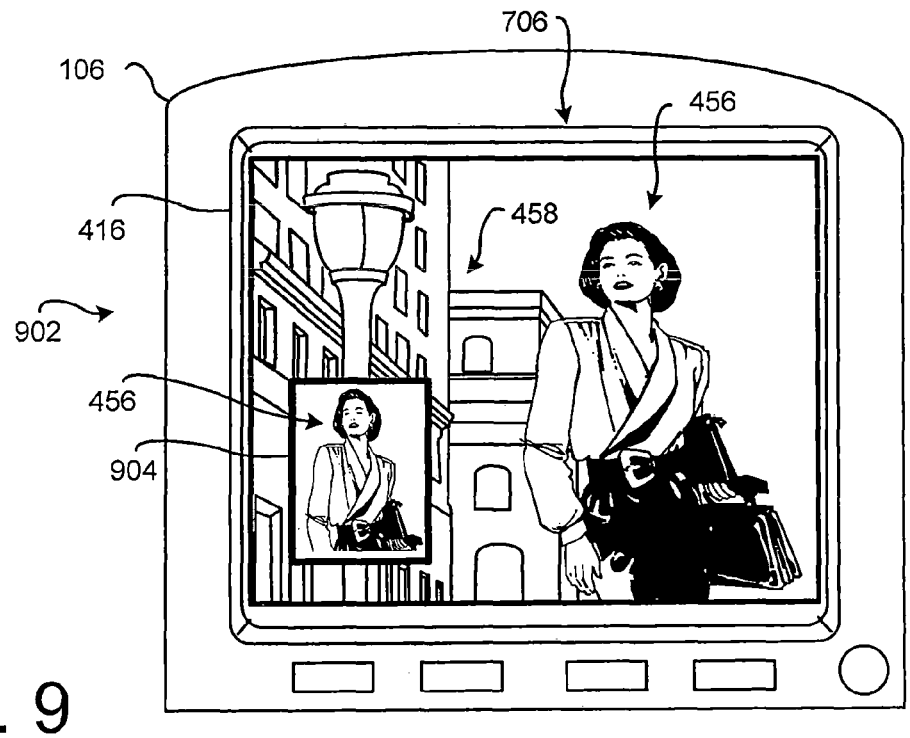
FIG. 9 illustrates a conceptual snapshot of another example conversation video.

FIG. 9 illustrates a conceptual snapshot of another example conversation video 902. Here, a view pane 904 with a video image of the currently speaking actress 456 is shown over the field that is presenting the currently discussed scene 706 of the subject thematic content event. Alternatively, or additionally, one or more of the example features illustrated in FIG. 8 may be included in this example conversation video 902.

Figure 10:
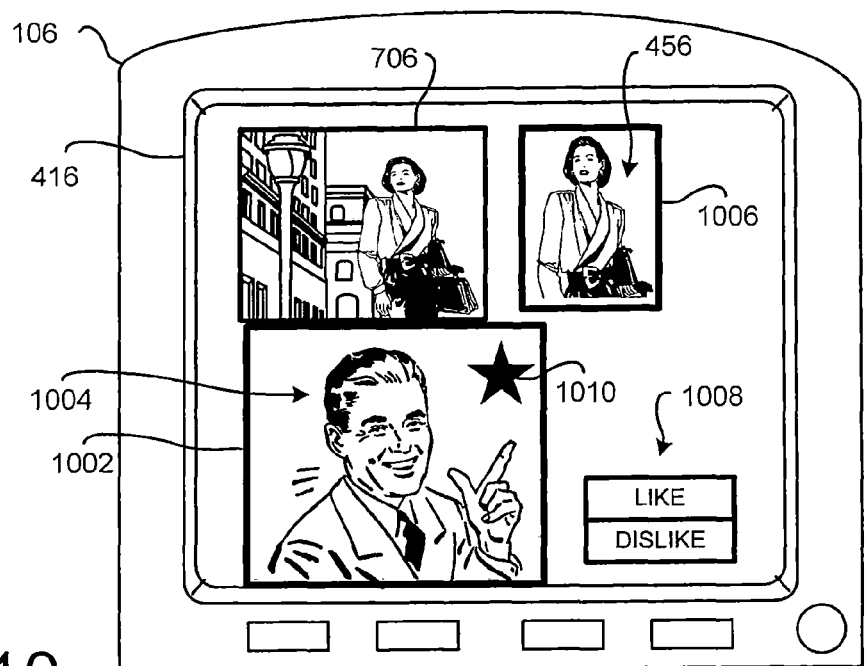
FIG. 10 illustrates a conceptual snapshot of an example proof video.

FIG. 10 illustrates a conceptual snapshot of an example proof video. Here, a view pane 1002 with a video image 1004 of the currently speaking community member who is presenting their personal views and opinions about subject thematic content event is shown. The video of the speaking member was previously submitted as a rant video. The proof video 1002 is also optionally presenting a currently discussed scene 706 of the subject thematic content event.

Additionally, an endorsement video 1006 of the actress 456 may be shown to indicate that the speaking community member 1004 is endorsed by the actress 456. In an example embodiment, an image of the actress 456 optionally remains presented during the proof video. At some point during presentation of the proof video 1002, the video clip of the actress as she is discussion the basis of her endorsement is presented.

A viewing member 104 who is viewing the proof video 1002 may like or may dislike the views and/or opinions of the speaking community member 1004. A voting pop-up pane 1008 is illustrated. The user 104 may select the like portion of the voting pop-up pane 1008, thus submitting an affirmation vote for the speaking community member 1004. Alternatively, the user 104 may select the dislike portion of the voting pop-up pane 1008, thus submitting a denial of affirmation vote. Other embodiments may graphically indicate to the user that they may vote for affirmation using any suitable graphic.

Optionally, a graphical icon 1010 or the like may be presented to indicate that the speaking community member 1004 has already achieved status as a recognized expert in the community. Any suitable icon may be used. Alternatively, or additionally, one or more characteristics of the view pane may be altered to indicate the recognized expert status of the speaking community member 1004. For example, but not limited to, a colored background shading may be used and/or a bolding or coloring of a line enclosing the view pane 1002 may be used.

It should be emphasized that the above-described embodiments of the video community system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method, comprising:
receiving, from a first media device, a rant video generated by a first community member who is a member of a plurality of community members,
wherein the rant video presents personal opinions and views of the community member about at least one of a thematic content event and a genre or topic pertaining to the thematic content event, and
wherein the rant video presents an assertion that the community member is knowledgeable about some aspect of the thematic content event and the genre or topic pertaining to the thematic content event;
generating a proof video from the received rant video, wherein the proof video comprises:
the rant video;
information identifying the first community member who generated the rant video; and
information identifying the thematic content event and the genre or topic pertaining to the thematic content event;
storing the generated proof video with a plurality of other proof videos generated by other community members;
receiving, after storing the generated proof video, a request for the generated proof video from a second community member who is another member of the plurality of community members, wherein the request includes information that identifies the first community member; and
communicating the proof video to a second media device used by the requesting second community member, wherein the proof video is presented by the second media device to the second community member.

2. The method of claim 1, further comprising:
receiving an endorsement video from another person,
wherein the other person is well known and recognized among members of the plurality of community members as being knowledgeable about the at least one of the thematic content event and the genre or topic pertaining to the thematic content event that is the subject matter of the rant video generated by the first community member, and
wherein the endorsement video is an endorsement for the assertion made in the rant video generated by the first community member;
wherein the generated proof video further comprises the endorsement video.

3. The method of claim 1, further comprising:
receiving, after communicating the proof video to the second community member, one of an affirmation vote and a denial of affirmation vote from the second media device used by the second community member,
wherein the affirmation vote and the denial of affirmation vote includes a unique identifier that identifies one of the first community member or the proof video;
wherein the affirmation vote is an affirmation of the first community member's assertion presented in the proof video,
wherein the denial of affirmation vote is a denial of affirmation of the first community member's assertion presented in the proof video;
affirming the first community member's assertion only when a total number of affirmation votes for the first community member exceeds a threshold or when a ratio of affirmation votes to denial of affirmation votes exceeds a ratio threshold.

4. The method of claim 3, further comprising:
receiving a member dialogue video from the first community member, wherein the member dialogue video expresses at least one of a personal opinion and a personal viewpoint of the first community member about at least a portion of the thematic content event associated with the rant video;

storing the member dialogue video of the first community member with a plurality of other member dialogue videos generated by other community members; and generating a conversation video that comprises:
- selected ones of the plurality of other member dialogue videos generated by other community members; and
- the member dialogue video of the first community member only if the first community member's assertion has been affirmed based on the received affirmation votes and denial of affirmation votes, wherein the conversation video emulates a conversation about the thematic content event between the community members who have had their member dialogue videos included in the generated conversation video.

5. The method of claim 4, after the generation of the conversation video, the method further comprising:
receiving, from a third media device, a first request for the generated conversation video from a third community member who is another member of the plurality of community members, wherein the request includes information that identifies the media content event; and
communicating the conversation video to the third media device used by the requesting third community member, wherein the conversation video is presented by the third media device to the third community member.

6. The method of claim 5, wherein the conversation video identifies a plurality of community members that generated at least one of the member dialogue videos of the conversation video, wherein the first community member is one of the community members that generated at least one of the member dialogue videos included in the conversation video, the method further comprising:
receiving, from the third media device of the third community member, a second request to receive the proof video that was based on the rant video generated by the first community member, wherein the request includes information that identifies the first community member, and wherein the second request is received after the first request;
accessing the stored proof video associated with the first community member; and
communicating the accessed proof video to the third media device of the third community member, wherein the proof video is presented by the third media device to the third community member.

7. The method of claim 3, further comprising:
receiving a plurality of affirmation votes from a first number of the plurality of community members for an affirmation of the first community member;
storing a first number of the affirmation votes received from the first number of the plurality of community members;
receiving a plurality of denial of affirmation votes from a second number of the plurality of community members for the denial of affirmation of the first community member; and
storing a second number of the denial of affirmation votes received from the second number of the plurality of community members.

8. The method of claim 7, further comprising:
receiving a denial of affirmation vote from a third community member;
increasing the second number of the denial of affirmation votes by one;
continuing to affirm the first community member's assertion only when the first number of affirmation votes for the first community member continues to exceed the threshold or when the ratio of the first number of affirmation votes to the second number of the denial of affirmation votes continues to exceed the ratio threshold; and
withdrawing the affirmation of the first community member's assertion when the first number of affirmation votes for the first community member becomes less than or equal to the threshold or when the ratio of the first number of affirmation votes to the second number of the denial of affirmation votes becomes less than or equal to the ratio threshold such that the first community member loses their affirmation.

9. The method of claim 7, further comprising:
receiving the denial of affirmation vote from the third community member who was one of the first number of the plurality of community members that previously provided their affirmation vote;
reducing the first number of the affirmation votes by one;
increasing the second number of the denial of affirmation votes by one;
continuing to affirm the first community member's assertion only when the total number of the first number of affirmation votes for the first community member continues to exceed the threshold or when the ratio of the first number of affirmation votes to the second number of the denial of affirmation votes continues to exceed the ratio threshold; and
withdrawing the affirmation of the first community member's assertion when the first number of affirmation votes for the first community member becomes less than or equal to the threshold or when the ratio of the first number of affirmation votes to the second number of the denial of affirmation votes becomes less than or equal to the ratio threshold.

10. The method of claim 2, wherein the endorsement video includes at least an audio portion with dialogue of the other person speaking, the method further comprising:
generating text from the dialogue of the endorsement video; and
determining an identity of the first community member based on the generated text of the dialogue of the endorsement video.

11. The method of claim 1, wherein the rant video comprises an audio portion with dialogue spoken by the first community member and a video portion capturing a video image of the first community member, and wherein generating the proof video from the received rant video comprises:
generating text from the dialogue of the rant video; and
determining the information identifying the first community member who generated the rant video based on the generated text of the dialogue of the rant video.

12. The method of claim 1, wherein the rant video comprises an audio portion with dialogue spoken by the first community member and a video portion capturing a video image of the first community member, and wherein generating the proof video from the received rant video comprises:
generating text from the dialogue of the rant video; and
determining the information identifying the thematic content event and the genre or topic pertaining to the thematic content event based on the generated text of the dialogue of the rant video.

13. A system, comprising:
a member interface communicatively coupled to a communication system, wherein the member interface receives:

a plurality of member dialogue videos each generated by one of a plurality of community members,
  wherein the member dialogue video includes a video portion and a corresponding audio portion,
  wherein the audio portion of the member dialogue video verbally expresses at least one of a personal opinion and a personal viewpoint about a particular portion of the thematic content event, and
  wherein the video portion of the member dialogue video is a video image of the community member who generated the member dialogue video;
at least one rant video generated by a first community member who is a member of the plurality of community members,
  wherein the rant video presents personal opinions and views of the community member about at least one of a thematic content event and a genre or topic pertaining to the thematic content event, and
  wherein the rant video presents an assertion that the first community member is knowledgeable about some aspect of the thematic content event and the genre or topic pertaining to the thematic content event;
a storage medium communicatively coupled to the member interface that stores the received plurality of member dialogue videos and the at least one rant video; and
a proof video generator that is communicatively coupled to a first storage medium and a second storage medium, wherein the proof video generator generates a proof video that comprises:
  the rant video;
  information identifying the first community member who generated the rant video; and
  information identifying the thematic content event and the genre or topic pertaining to the thematic content event,
wherein the system receives, after the proof video has been generated, a request for the generated proof video from a second community member who is another member of the plurality of community members, wherein the request includes information that identifies the first community member, and
wherein the system communicates the proof video to a second media device used by the requesting second community member, wherein the proof video is presented by the second media device to the second community member.

14. The system of claim 13, wherein the storage medium is a first storage medium, the system further comprising:
a second storage medium that stores at least one modified thematic content event that has been generated from a thematic content event,
  wherein the modified thematic content event comprises a plurality of anchor points that have been added into the thematic content event,
  wherein each anchor point comprises a unique anchor point identifier and an anchor point locator,
  wherein the anchor point locator identifies a location in the modified thematic content event that is associated with the anchor point, and
  wherein the anchor point identifier uniquely identifies the anchor point from other anchor points associated with the modified thematic content event; and
a conversation video generator that generates a conversation video pertaining to the thematic content event, wherein the conversation video comprises:
  selected ones of the plurality of member dialogue videos,
  wherein each selected member dialogue video is associated with at least one anchor point of the modified thematic content event,
  wherein the conversation video generator selects, for each anchor point in the thematic content event, at least one of the selected member dialogue videos that are associated with that anchor point,
wherein the system communicates the conversation video to a third media device used by a requesting third community member, wherein the conversation video is presented by the third media device to the third community member.

15. The system of claim 14, wherein at least one of the selected member dialogue videos was generated by the first community member, wherein the selected member dialogue video of the first community member was selected based on an affirmation by other members of the plurality of community members, and wherein the affirmation affirms an assertion of the first community member in the rant video that the first community member is knowledgeable about some aspect of the thematic content event and the genre or topic pertaining to the thematic content event.

16. The system of claim 15, wherein the conversation video includes information that identifies the first community member, wherein the system receives a request for the proof video associated with the first community member, wherein the request for the proof video is based on the information that identifies the first community member, and wherein the proof video generated by the first community member is communicated to the third media device for presentation to the third community member.

17. The system of claim 14, wherein the modified thematic content event further comprises:
a plurality of keyword descriptors, wherein a keyword descriptor comprises a unique keyword identifier and at least one keyword,
  wherein the keyword identifier uniquely identifies the keyword descriptor from other keyword descriptors;
  wherein the keyword identifier of each one of keyword descriptors is associated with at least one anchor point identifier, and
  wherein each keyword is one of a single word or a phrase that is descriptive of a characteristic of the modified thematic content event at the location in the modified thematic content event identified by the associated anchor point.

18. The system of claim 17, wherein the conversation video generator further comprises:
a text search engine that generates text from the dialogue of the selected member dialogue video,
  wherein the conversation video generator identifies at least one keyword of the text from the dialogue of the selected member dialogue video,
  wherein the conversation video generator then compares the at least one keyword of the text from the dialogue of the selected member dialogue video with keywords of the anchor points of the modified thematic content event,
  wherein the conversation video generator then associates the selected member dialogue video with the anchor point when the text from the dialogue of the selected member dialogue video matches the keyword of the anchor point such that a location of the selected member dialogue video within the conversation video is based on the location of the anchor point in the modified thematic content event.

19. A method, comprising:

providing a non-transitory computer readable medium to a communication interface of a media device that communicatively couples the media device to a video community system that generates and stores a plurality of conversation videos that are each associated with one of a plurality of thematic content events,
- wherein each one of the stored conversation videos presents a series of member dialogue videos generated by members of the video community system,
- wherein each member dialogue video is generated by one of the members of the video community system, and
- wherein each member dialogue video includes a video portion and a corresponding audio portion that expresses at least one of a personal opinion and a personal viewpoint about an associated thematic content event; and wherein the received non-transitory computer readable medium stored in a memory of the media device enables the media device to:
- receive a first conversation video that is one of the plurality of conversation videos stored at the video community system,
  - wherein the first conversation video is received in response to a request that has been communicated from the media device to the video community system, and
  - wherein the request includes information that identifies the thematic content event that is associated with the requested first conversation video; and
- receive a commentary from a user of the media device about a thematic content event of interest, wherein the user's commentary is obtained from a camera and microphone device of the media device, and wherein the user's commentary comprises:
  - an audio portion corresponding to audio commentary spoken by the user; and
  - a video portion that is a video of the user while the user is speaking their audio commentary; and
- communicate the user's commentary from the media device to the video community system after the user has concluded their commentary about the thematic content event of interest, wherein the video community system generates a member dialogue video from the user's commentary, wherein the member dialogue video further includes information that uniquely identifies the user from the other members of the video community system and includes information that uniquely identifies the thematic content event of interest, wherein the video community system is configured to generate a conversation video that emulates a conversation by community members about the thematic content event of interest, and wherein the conversation video includes at least a portion of the member dialogue video generated from the user's commentary provided by the media device.

20. The method of claim 19, wherein the received non-transitory computer readable medium enables the media device to receive the conversation video from the video community system in response to a first user request made by the user of the media device, wherein the received non-transitory computer readable medium enables the media device to receive a second user request to have a proof video associated with a first community member who is presenting their member dialogue video in the received conversation video, wherein the first community member is identified in the second user request, wherein the received non-transitory computer readable medium enables the media device to communicate the second user request to the video community system, wherein the received non-transitory computer readable medium enables the media device to receive the proof video from the video community system, wherein the proof video comprises a rant video generated by the first community member that expresses:
- personal opinions and views of the first community member about at least one of the thematic content event and a particular genre or topic pertaining to the thematic content event, and
- an assertion that the first community member is knowledgeable about some aspect of the particular thematic content event and the particular genre or topic pertaining to the thematic content event, and wherein the received proof video is presented to the user by the media device.

\* \* \* \* \*